(12) United States Patent
Yukawa et al.

(10) Patent No.: US 7,961,458 B2
(45) Date of Patent: Jun. 14, 2011

(54) ELECTRONIC APPARATUS AND ELECTRONIC APPARATUS MANUFACTURING METHOD

(75) Inventors: Shuhei Yukawa, Tokyo (JP); Yoshikazu Iriguchi, Nagano (JP)

(73) Assignee: Sony Corporation, Tokyo (JP)

( * ) Notice: Subject to any disclaimer, the term of this patent is extended or adjusted under 35 U.S.C. 154(b) by 60 days.

(21) Appl. No.: 12/533,522

(22) Filed: Jul. 31, 2009

(65) Prior Publication Data

US 2010/0053874 A1 Mar. 4, 2010

(30) Foreign Application Priority Data

Sep. 1, 2008 (JP) .................................. 2008-223375

(51) Int. Cl.
*G06F 1/16* (2006.01)
(52) U.S. Cl. ................. 361/679.21; 312/223.1; 29/592.1
(58) Field of Classification Search ............. 361/679.21; 29/592.1; 312/223.1
See application file for complete search history.

(56) References Cited

U.S. PATENT DOCUMENTS

| | | | | |
|---|---|---|---|---|
| 6,067,133 | A * | 5/2000 | Niibori et al. ................... | 349/60 |
| 6,809,921 | B2 * | 10/2004 | Wu et al. .................. | 361/679.56 |
| 7,423,878 | B2 * | 9/2008 | Kim ............................... | 361/704 |
| 2006/0192890 | A1 * | 8/2006 | Watanabe et al. ............. | 348/373 |
| 2007/0201195 | A1 * | 8/2007 | Saiki et al. .................... | 361/681 |

FOREIGN PATENT DOCUMENTS

| | | |
|---|---|---|
| JP | 62-117632 | 7/1987 |
| JP | 63-187374 | 11/1988 |
| JP | 4-221891 | 8/1992 |
| JP | 2008-3247 | 1/2008 |

OTHER PUBLICATIONS

Office Action issued Aug. 17, 2010, in Japanese Patent Application No. 2008-223375.

* cited by examiner

*Primary Examiner* — Lisa Lea-Edmonds
(74) *Attorney, Agent, or Firm* — Oblon, Spivak, McClelland, Maier & Neustadt, L.L.P.

(57) ABSTRACT

An electronic apparatus includes a base body that is made of a resin and includes two first side surfaces and two second side surfaces, two first exterior members that are each made of metal and respectively cover the two first side surfaces, a second exterior member that is made of metal and adhered to one of the second side surfaces, a plurality of dowel pins provided to the two first exterior members, a plurality of dowel hole portions that are capable of receiving the plurality of dowel pins, respectively, a plurality of held portions provided on a surface of the second exterior member, in correspondence with the plurality of dowel hole portions, and a plurality of elastic holders that are provided on the one of the second side surfaces of the base body and capable of holding and elastically supporting the plurality of held portions, respectively.

11 Claims, 24 Drawing Sheets

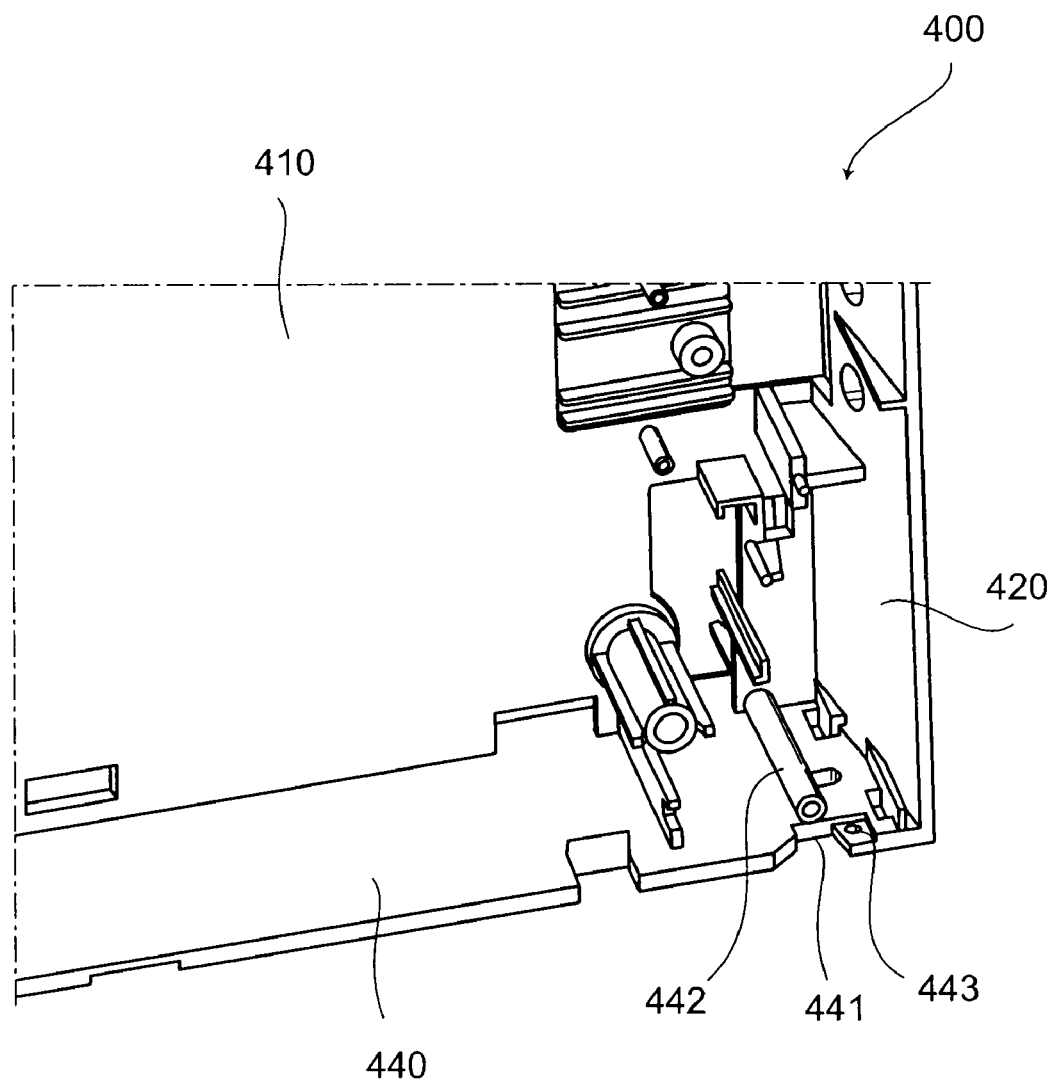
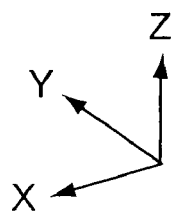
FIG.7

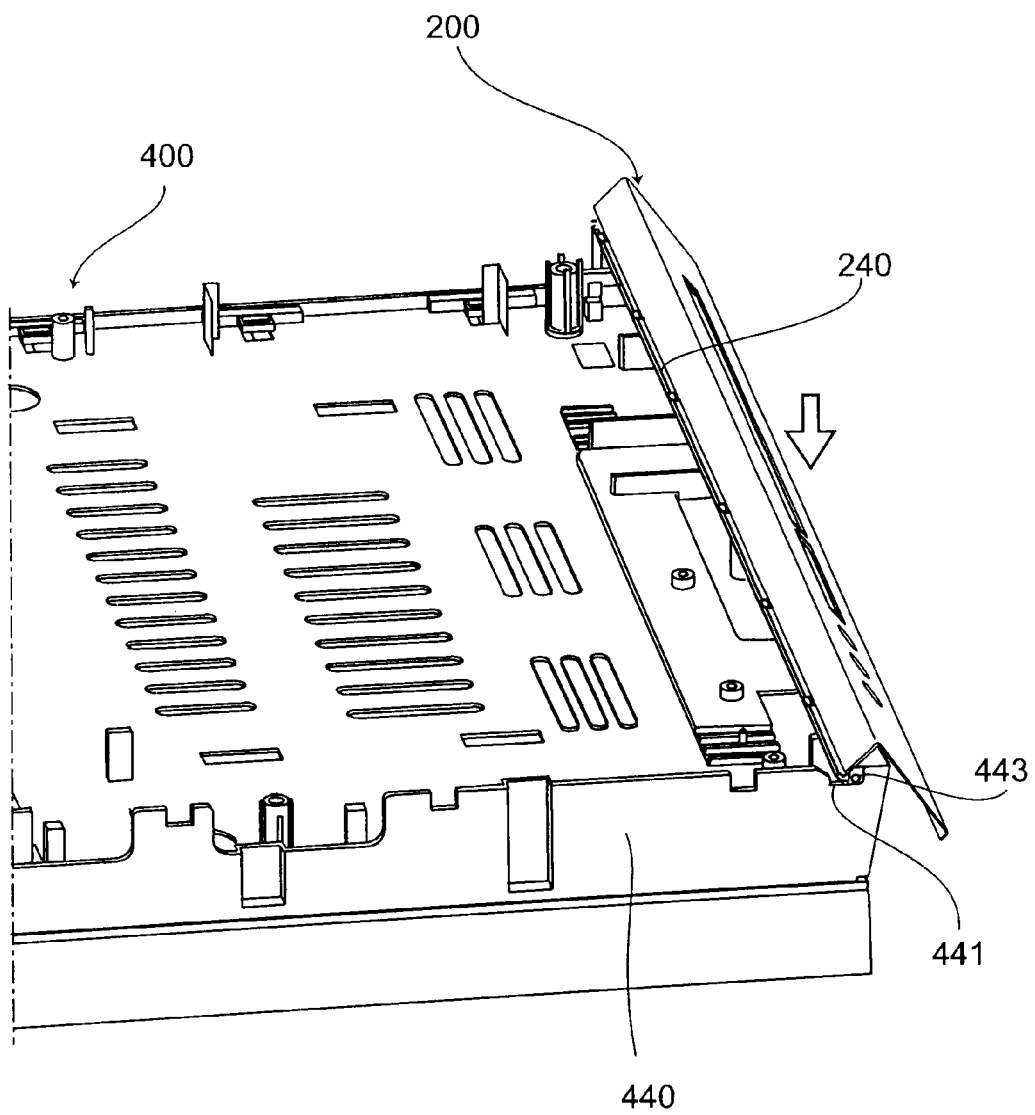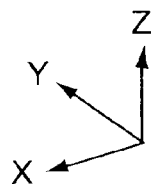
FIG.8

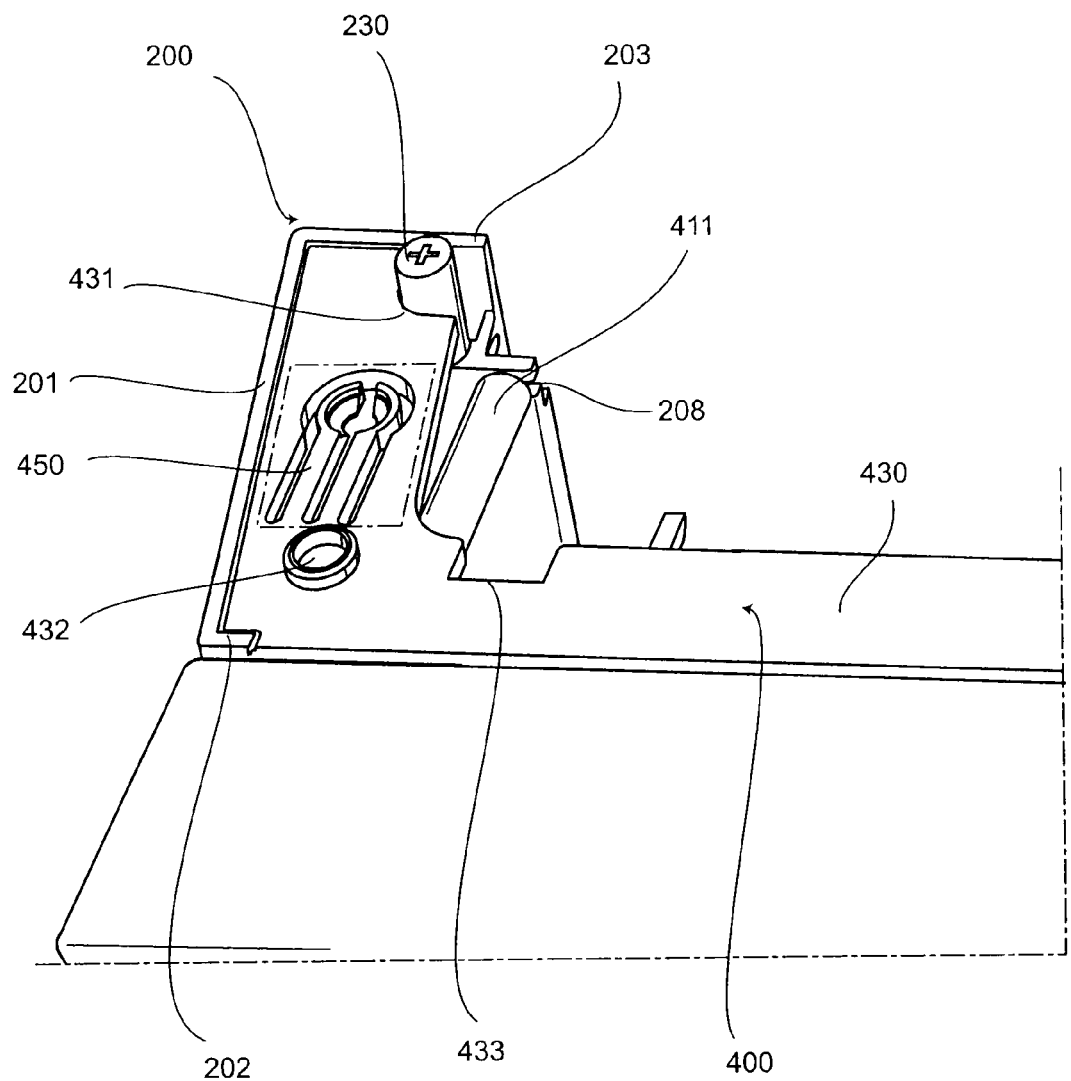
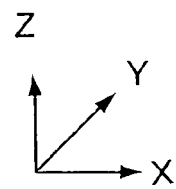
FIG.15

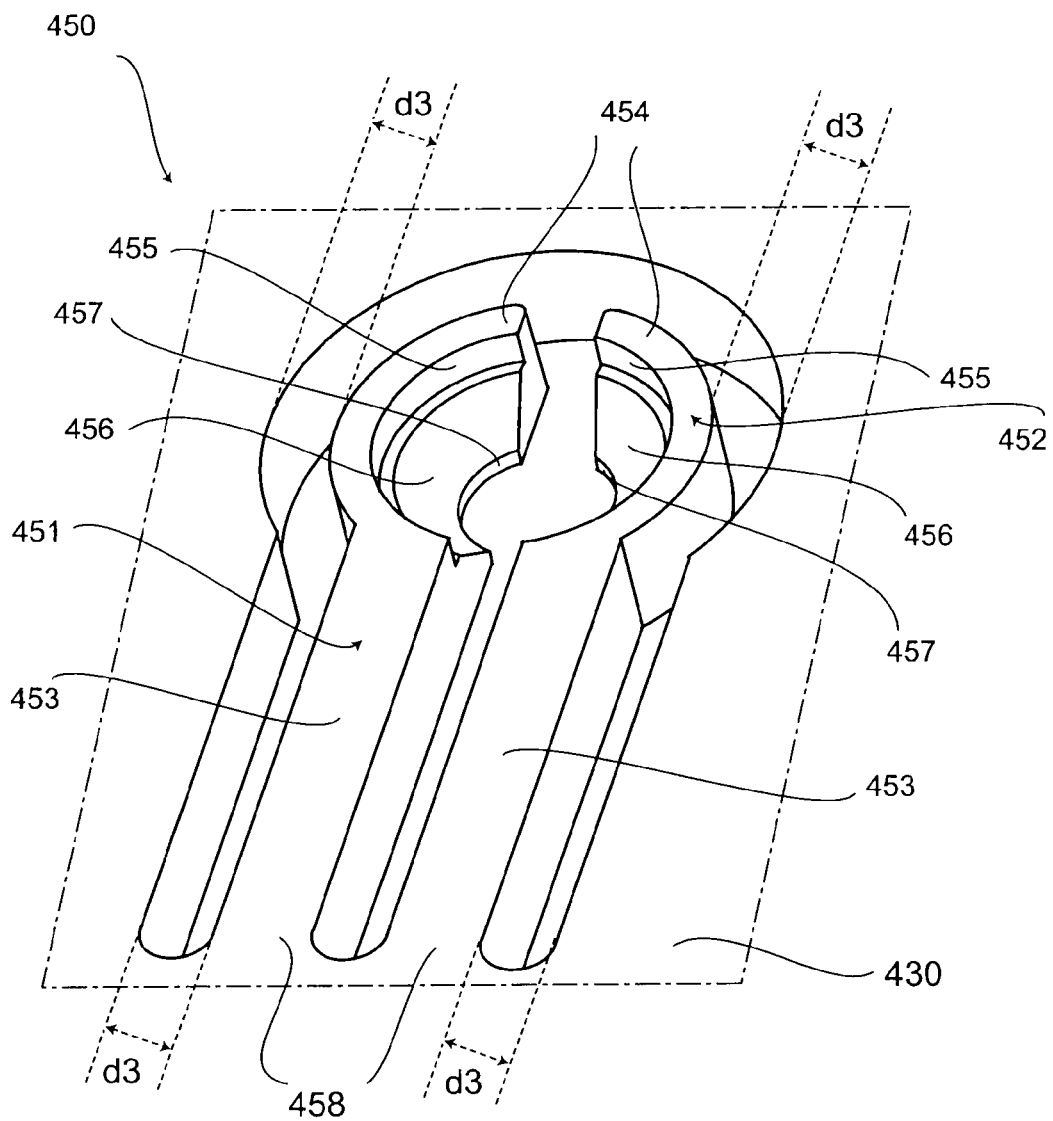
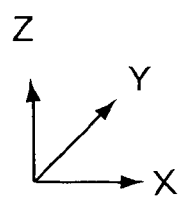
FIG.16

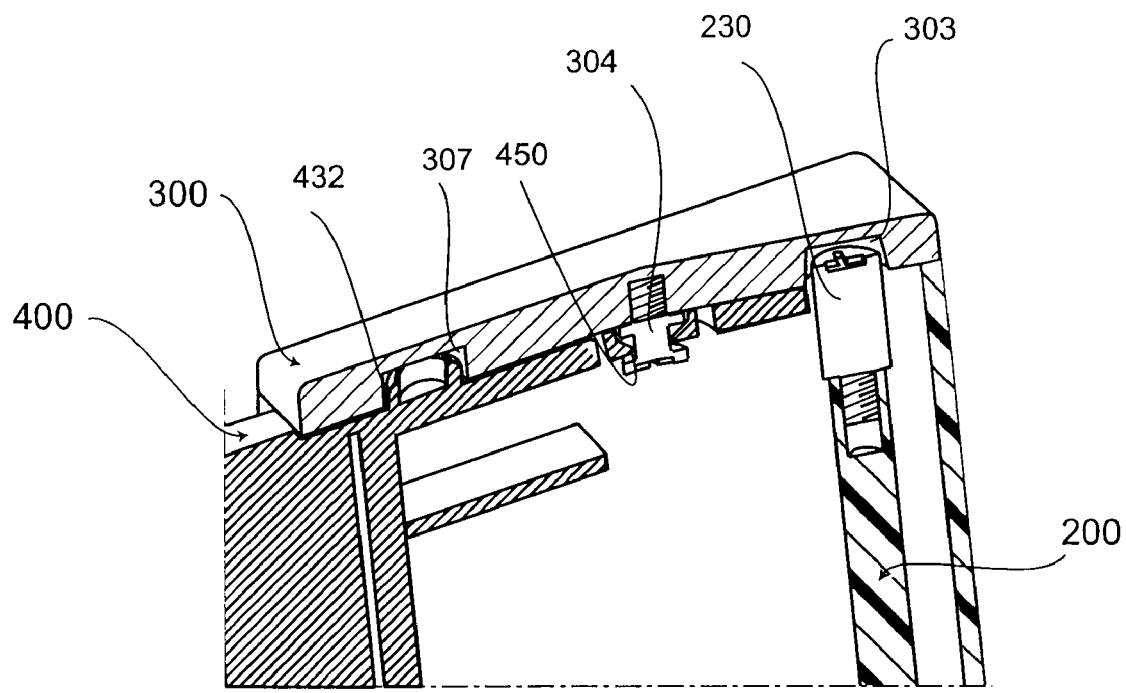
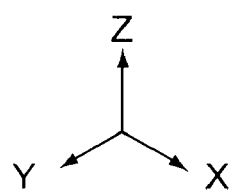
FIG.18

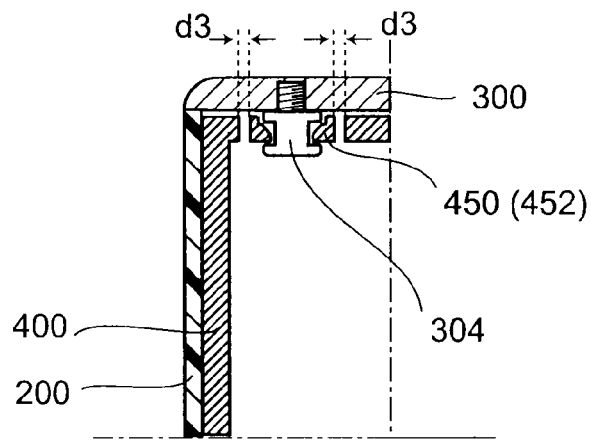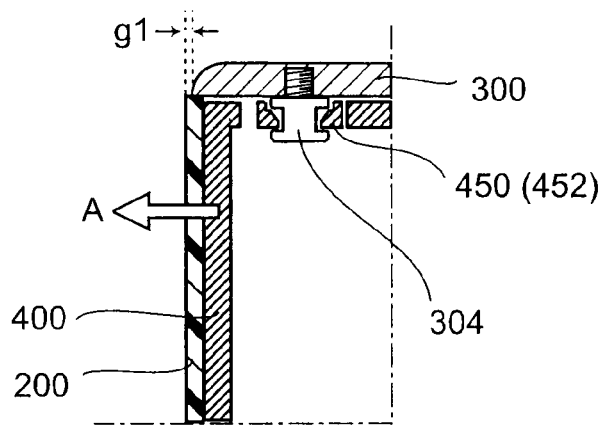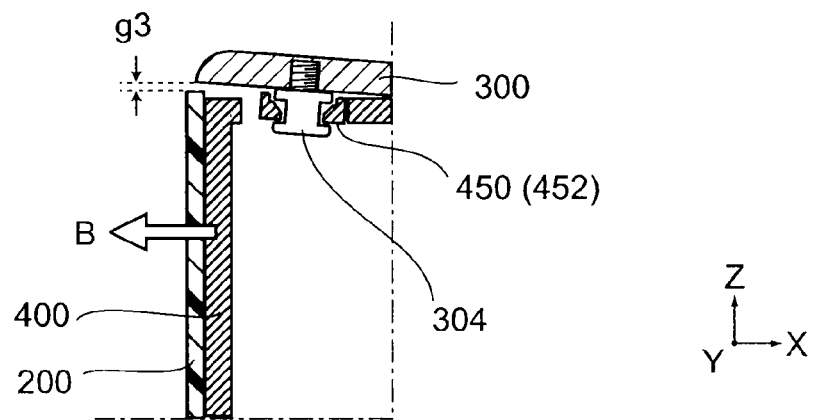

ELECTRONIC APPARATUS AND ELECTRONIC APPARATUS MANUFACTURING METHOD

BACKGROUND OF THE INVENTION

1. Field of the Invention

The present invention relates to an electronic apparatus including a base body and an exterior member formed of materials having different thermal expansion coefficients, and an electronic apparatus manufacturing method.

2. Description of the Related Art

Recently, there is proposed an electronic apparatus such as a desktop personal computer (hereinafter referred to as PC) having exterior members made of a metal material such as aluminum on side surfaces, for adding a quality appearance (for example, see Japanese Patent Application Laid-open No. 2008-3247, paragraphs [0050]-[0051], FIG. 9; hereinafter referred to as Patent Document 1).

In general, as a base body provided in the electronic apparatus and mounted with various members and exterior members, a base body made of a resin is employed for the purpose of weight reduction and the like. However, since the resin and the metal material such as aluminum are different in thermal expansion coefficient, in a case where exterior members made of a metal material such as aluminum are attached to the base body made of a resin, there is a fear that a gap may be generated between the exterior members, which are normally in contact with each other, due to temperature change and the like.

In order to prevent the occurrence of a gap due to different thermal expansion coefficients, according to a frame apparatus for an electronic apparatus of Patent Document 1, L-shaped corner bracket members made of metal are provided at four corners of an electronic apparatus having a rectangular shape in a plan view. Metal frame members are attached to the corner bracket members such that each metal frame member overlaps with the corner bracket members. The corner bracket members are fixed to a panel member made of a resin. Only the corner bracket members are fixed to the panel member made of a resin, and the frame members overlapping with the corner bracket members are not fixed thereto, so a gap is not generated even when the positions of the frame members change.

SUMMARY OF THE INVENTION

However, since the frame apparatus for an electronic apparatus of Patent Document 1 includes a plurality of corner bracket members, the number of members and costs increase. Further, since the frame members and the corner bracket members are overlapped with each other, the structure is complicated and the assembly operation is also complicated.

In view of the above-mentioned circumstances, it is desirable to provide an electronic apparatus having a base body and exterior members formed of materials having different thermal expansion coefficients, the electronic apparatus being capable of controlling gaps that are due to the different thermal expansion coefficients and the like with a simple structure without an increase in the number of members.

It is further desirable to provide an electronic apparatus manufacturing method that realizes easier manufacture and higher reliability.

According to an embodiment of the present invention, there is provided a base body, two first exterior members, a second exterior member, a plurality of dowel pins, a plurality of dowel hole portions, a plurality of held portions, and a plurality of elastic holders. The base body is made of a resin and includes a rectangular main surface, two first side surfaces respectively including two short sides of the main surface, and two second side surfaces respectively including two long sides of the main surface. The two first exterior members are each made of metal and respectively cover the two first side surfaces of the base body. The second exterior member is made of metal and adhered to the base body such that one of the second side surfaces of the base body is covered by the second exterior member. The plurality of dowel pins are provided to the two first exterior members such that tip end portions thereof protrude from the one of the second side surfaces of the base body. The plurality of dowel hole portions are provided to the second exterior member and capable of receiving the plurality of dowel pins, respectively. The plurality of held portions are provided on a surface of the second exterior member that faces the one of the second side surfaces of the base body while protruding therefrom, the plurality of held portions being provided in correspondence with the plurality of dowel hole portions. The plurality of elastic holders are provided on the one of the second side surfaces of the base body and capable of holding and elastically supporting the plurality of held portions, respectively.

According to the embodiment of the present invention, the base body and the second exterior member are supported based on an insertion relationship of the dowel pin and the dowel hole portion and a hold relationship of the held portion and the elastic holders. Accordingly, even if the dowel pin moves from a normal position with respect to the dowel hole portion, the elastic holder can hold and elastically support the held portion. Accordingly, even when the positional relationship of the base body and the second exterior member changes from the normal position, the support relationship of the base body and the second exterior member is not adversely affected.

In the electronic apparatus of this embodiment, each of the plurality of elastic holders includes an elongated portion having one end portion continuously formed with the base body and a holder that is provided to the other end portion of the elongated portion and holds the corresponding one of the plurality of held portions.

According to the embodiment of the present invention, the elastic holder includes a portion continuously formed with the base body and a portion for holding the held portion provided to the second exterior member. Accordingly, even when there is a fear that the positional relationship of the base body and the second exterior member may change from the normal position, the support relationship of the base body and the second exterior member is not adversely affected.

The electronic apparatus of this embodiment may further include a display unit provided on the main surface. Each of the plurality of elastic holders is provided closer to the main surface than each of the plurality of dowel pins in a depth direction of the display unit.

According to the embodiment of the present invention, the elastic holder having a portion continuously formed with the base body is provided closer to the display unit than the dowel pin is. Accordingly, even when the second exterior member moves from the normal position with respect to the base body, since the elastic holder is continuously formed with the base body on the display unit side, it is not recognized by a user that the second exterior member has moved from the normal position with respect to the base body when the user sees the electronic apparatus from the display unit side.

In the electronic apparatus of this embodiment, the elongated portion of each of the plurality of elastic holders is provided closer to the main surface than each of the plurality of holders in the depth direction of the display unit.

According to the embodiment of the present invention, the portion of the elastic holder continuously formed with the base body is provided closer to the display unit than the holder is. Accordingly, even when the second exterior member moves from the normal position with respect to the base body, since the elastic holder is continuously formed with the base body on the display unit side, it is not recognized by a user that the second exterior member has moved from the normal position with respect to the base body when the user sees the electronic apparatus from the display unit side.

In the electronic apparatus of this embodiment each of the plurality of held portions includes a column portion that has a first diameter, protrudes from the second exterior member, and is held by the holder, and a stopper portion that has a second diameter larger than the first diameter and is provided on a tip end portion of the column portion.

According to the embodiment of the present invention, since the held portion includes the stopper portion, the held portion held by the elastic holder hardly detaches from the elastic holder.

In the electronic apparatus of this embodiment, the holder includes a first tapered portion that guides insertion of the corresponding one of the plurality of held portions.

According to the embodiment of the present invention, since the holder includes the first tapered portion, the insertion of the held portion can be easily and reliably executed.

In the electronic apparatus of this embodiment, each of the plurality of dowel hole portions includes a second tapered portion that guides insertion of the corresponding one of the plurality of dowel pins.

According to the embodiment of the present invention, since the dowel hole portion includes the second tapered portion, the insertion of the dowel pin can be easily and reliably executed. Accordingly, even when the second exterior member moves from the normal position with respect to the base body and the dowel pin moves from the normal position with respect to the second tapered portion, the dowel pin can easily and reliably return to the dowel hole portion while being guided by the second tapered portion.

The electronic apparatus of this embodiment may further include a plurality of boss portions and a plurality of boss receiving hole portions. The plurality of boss portions are provided on the one of the second side surfaces of the base body and protrude from the one of the second side surfaces, the plurality of boss portions being provided in correspondence with the plurality of elastic holders. The plurality of boss receiving hole portions are provided to the second exterior member and capable of receiving the plurality of boss portions, respectively.

According to the embodiment of the present invention, the boss portion is inserted to the boss receiving hole portion. Accordingly, reliability of the support relationship of the base body and the second exterior member further improves.

In the electronic apparatus of this embodiment, a length of each of the plurality of boss portions in a direction of the short sides of the main surface is smaller than a length of each of the dowel pins protruding from the second side surface in the direction of the short sides of the main surface.

In the electronic apparatus of this embodiment, each of the plurality of boss portions is provided closer to the main surface than each of the plurality of elastic holders in the depth direction of the display unit.

According to the embodiment of the present invention, even when the dowel pin moves from the normal position with respect to the second tapered portion, it is hardly recognized by a user that the second exterior member has moved from the normal position with respect to the base body when the user sees the electronic apparatus from the display unit side.

In the electronic apparatus of this embodiment, the second exterior member includes an adhesion prohibition area in which provision of the adhesion is prohibited, and the adhesion prohibition area includes at least a center portion of the second exterior member in a direction of the long sides of the main surface.

According to the embodiment of the present invention, an adhesive member is hardly peeled off. Further, also when the second exterior member returns to the normal position with respect to the base body, re-adhesion of a peeled adhesive member to the base body does not occur. Thus, the second exterior member can return to the normal position.

According to an embodiment of the present invention, there is provided an electronic apparatus manufacturing method including: adhering, to a base body that is made of a resin and includes a rectangular main surface, two first side surfaces respectively including two short sides of the main surface, and two second side surfaces respectively including two long sides of the main surface, two first exterior members each made of metal such that the two first side surfaces of the base body are respectively covered by the two first exterior members; engaging a plurality of dowel pins provided to the two first exterior members such that tip end portions thereof protrude from one of the second side surfaces of the base body, with a plurality of dowel hole portions that are provided to a second exterior member made of metal and capable of receiving the plurality of dowel pins, respectively; engaging a plurality of held portions provided on a surface of the second exterior member that faces the one of the second side surfaces of the base body while protruding therefrom, the plurality of held portions being provided in correspondence with the plurality of dowel hole portions, with a plurality of elastic holders that are provided on the one of the second side surfaces of the base body and capable of holding and elastically supporting the plurality of held portions, respectively; and adhering the second exterior member to the base body such that the second exterior member covers the one of the second side surfaces of the base body.

According to the embodiment of the present invention, the base body and the second exterior member are supported based on an insertion relationship of the dowel pin and the dowel hole portion and a hold relationship of the held portion and the elastic holders. Accordingly, even if the dowel pin moves from a normal position with respect to the dowel hole portion, the elastic holder can hold and elastically support the held portion. Accordingly, even when the positional relationship of the base body and the second exterior member changes from the normal position, the support relationship of the base body and the second exterior member is not adversely affected.

As described above, according to the electronic apparatus of the embodiments of the present invention, it is possible to control gaps that are due to different thermal expansion coefficients and the like with a simple structure without an increase in the number of members.

According to the electronic apparatus manufacturing method of the embodiment of the present invention, easier manufacture and higher reliability can be realized.

These and other objects, features and advantages of the present invention will become more apparent in light of the following detailed description of best mode embodiments thereof, as illustrated in the accompanying drawings.

BRIEF DESCRIPTION OF DRAWINGS

FIG. 7 is a partial perspective view showing the base body seen from the back surface side;

FIG. 8 is a partial perspective view showing a state where the side surface exterior member is being attached to the side surface portion of the base body, the perspective view showing the back surface side of the base body;

FIG. 15 is a partial perspective view showing the base body attached with the side surface exterior member;

FIG. 16 is a partially-enlarged view showing an area surrounded by a dashed line in FIG. 15.

FIG. 18 is a cross-sectional view showing the top surface exterior member attached to the base body;

FIG. 20 are other cross-sectional views each showing a portion of the PC for explaining the change of the shape of the PC due to the increased temperature;

DESCRIPTION OF PREFERRED EMBODIMENTS

Hereinafter, an embodiment of the present invention will be described with reference to the attached drawings.

(Structure of Desktop Personal Computer)

Figure 1:
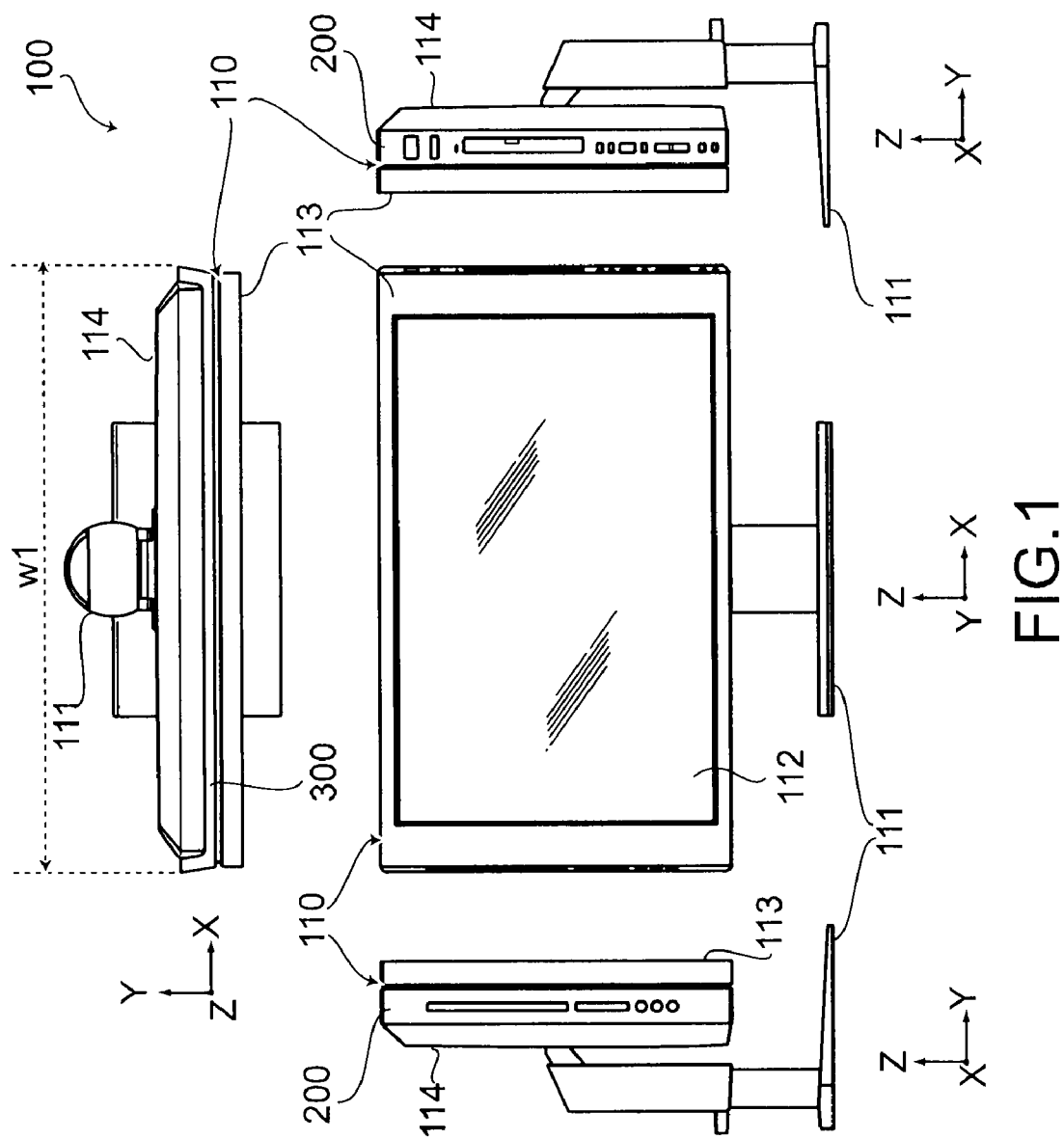
FIG. 1 is a diagram of a desktop personal computer (PC) according to an embodiment of the present invention, seen from four sides.
Figure 2:
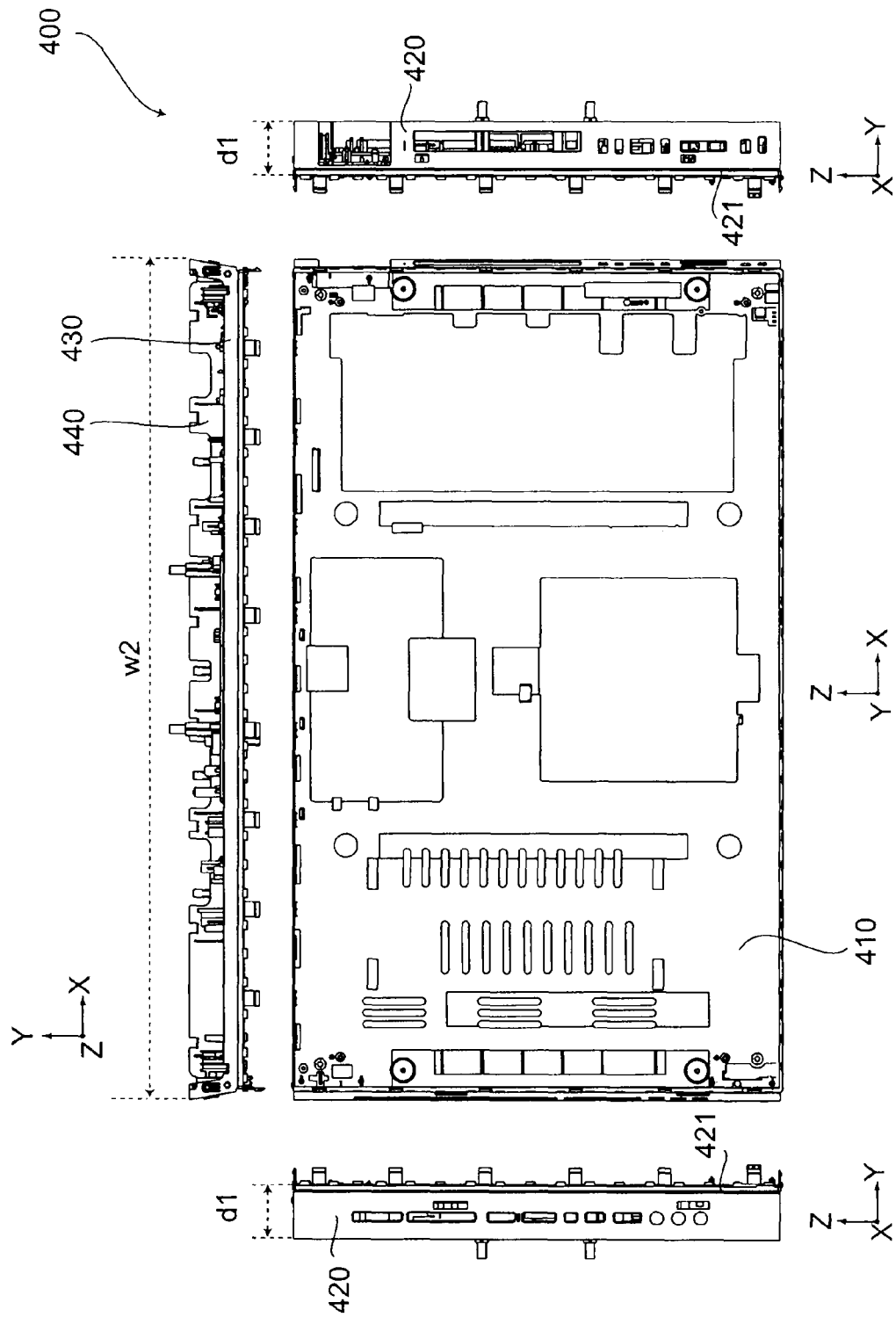
FIG. 2 is a diagram of a base body provided to a main body portion, seen from four sides.
Figure 3:
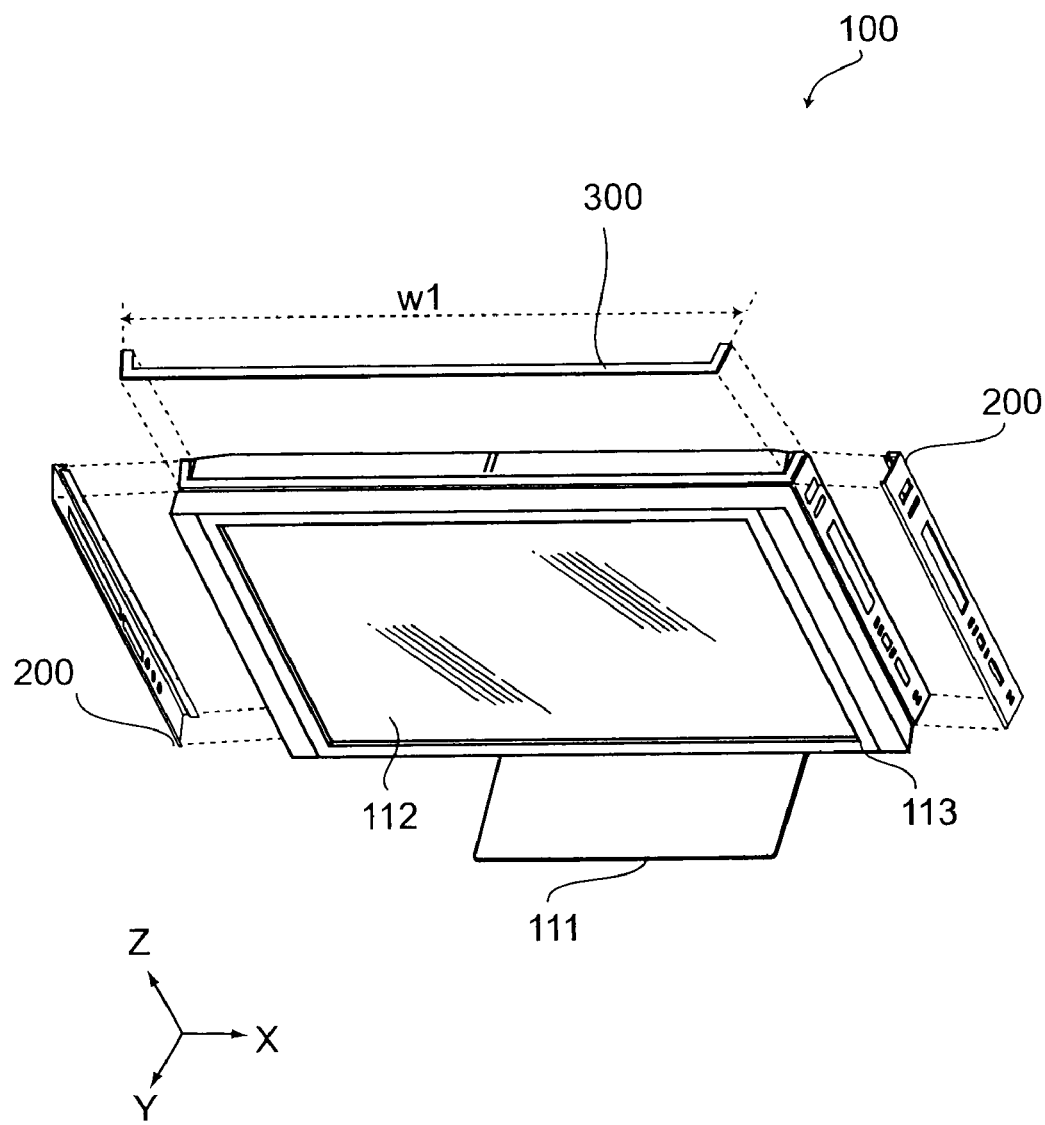
FIG. 3 is a perspective view for explaining the PC of FIG. 1.
Figure 4:
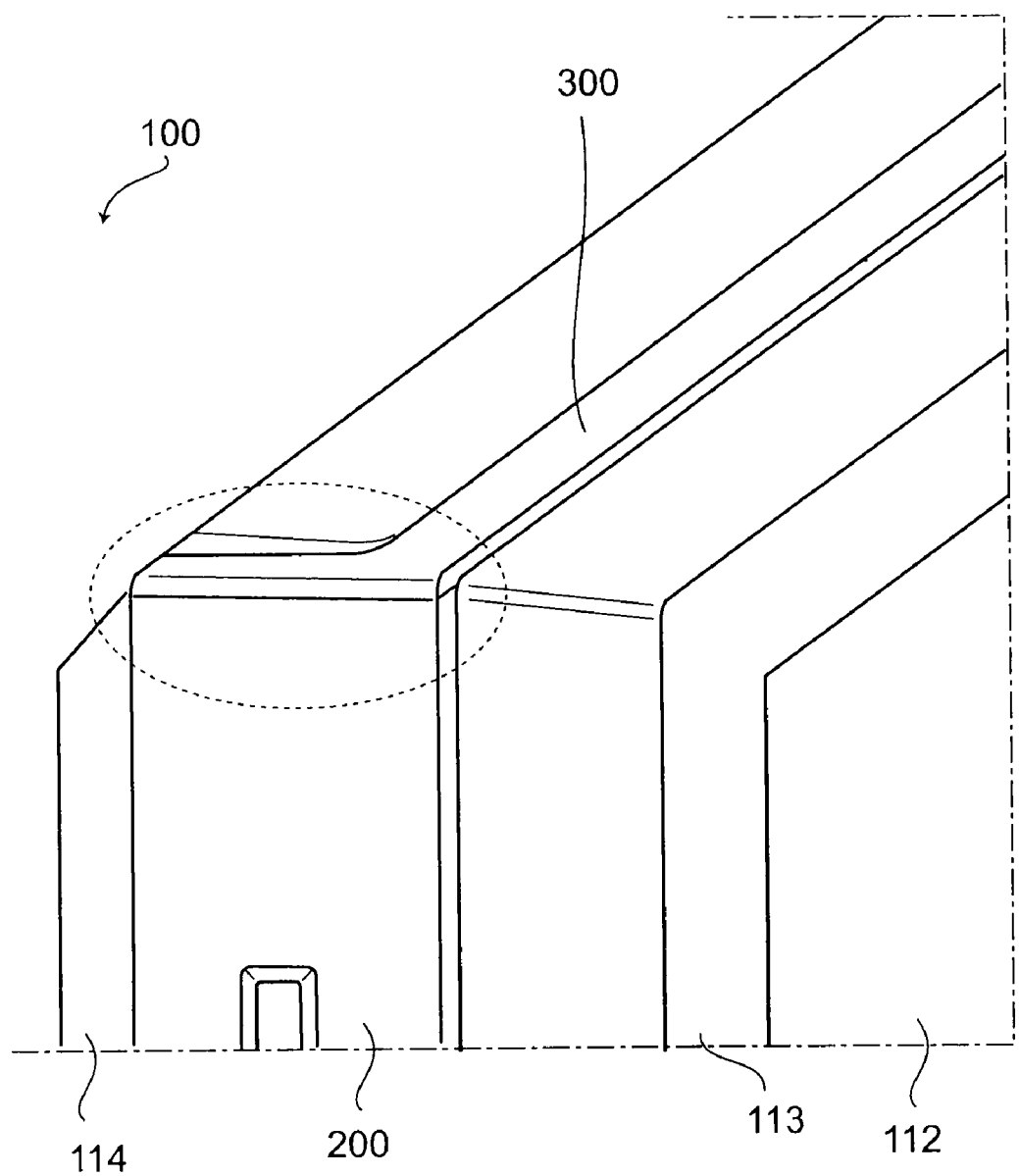
FIG. 4 is a partial perspective view showing a positional relationship of a side surface exterior member and a top surface exterior member.

FIG. 1 is a diagram of a desktop personal computer (PC) according to an embodiment of the present invention, seen from four sides. FIG. 2 is a diagram of a base body provided to a main body portion 110, seen from four sides. FIG. 3 is a perspective view for explaining the PC of FIG. 1. FIG. 4 is a partial perspective view showing a positional relationship of a side surface exterior member 200 and a top surface exterior member 300.

As shown in FIG. 1, a PC 100 (electronic apparatus) includes the main body portion 110 and a stand 111 supporting the main body portion 110. The main body portion 110 includes therein a base body 400 of FIG. 2.

The main body portion 110 has a case shape and is rectangular when seen from the front side. The main body portion 110 includes a display unit 112, a bezel 113, and a back cover 114. Those members are attached to the base body 400.

The main body portion 110 includes a system board, an optical disc drive, a hard disk drive, and a cooling fan (not shown). The system board is mounted with various electronic components such as a CPU (Central Processing Unit), a main memory, a chipset, and control circuits for various drives. The optical disc drive is connected to a connector terminal of the system board. An optical disc such as a CD, a DVD, or a Blu-ray disc is detachably mounted to the optical disc drive, and the optical disc drive reads/writes information from/to the optical disc. The hard disk drive is connected to a connector terminal of the system board, includes a hard disk therein, and reads/writes information from/to the hard disk. The cooling fan cools the CPU mounted to the system board, and other heater elements. Those components are mounted to the base body 400.

On a side surface of the main body portion 110, for example, various card slots, a memory stick slot, a headphone output terminal, an optical disc insertion portion, a USB (Universal Serial Bus) connector interface, and the like are provided.

The display unit 112 is, for example, a liquid crystal display exemplified by a 25.5-inch large-size liquid crystal display. The bezel 113 is provided around the display unit 112.

The back cover 114 is provided on a surface of the main body portion 110 opposite to the surface provided with the display unit 112. To the back cover 114, for example, a power input terminal, a phone jack, a LAN (Local Area Network) connector, an AV (Audio Visual) input/output terminal (not shown) are provided.

The stand 111 is provided to the back cover 114 and supports the main body portion 110 with respect to a mount surface on which the PC 100 is placed.

As shown in FIG. 3, on the side surfaces and the top surface of the base body 400, the plurality of exterior members are provided. Specifically, the plurality of side surface exterior members 200 (first exterior members) are provided to the side surfaces, and the top surface exterior member 300 (second exterior member) is provided to the top surface. The side surface exterior members 200 and the top surface exterior member 300 are made of a metal material such as aluminum. The side surface exterior members 200 have openings provided at positions corresponding to the above-mentioned interfaces. The top surface exterior member 300 has a width w1 of approximately 662 mm in a long side direction, in a case where the display unit 112 is a 25.5-inch large-size liquid crystal display.

The base body 400 is a molded component made of a resin such as a PC/ABS (polycarbonate/ABS resin) alloy. As shown in FIG. 2, the base body 400 includes a rectangular main surface portion 410, two side surface portions 420 (first side surfaces) sharing respective short sides of the main surface portion 410, and a top surface portion 430 (second side surface) and a bottom surface portion 440 (second side surface) sharing respective long sides of the main surface portion 410. The base body 400 has a width w2 of approximately 659 mm in a long side direction, in the case where the display unit 112 is a 25.5-inch large-size liquid crystal display.

The display unit 112 is attached to one of the front and back surfaces of the main surface portion 410. In the main body portion 110, various components and the like are attached to both the front and back surfaces of the main surface portion 410.

To the side surface portions 420, the side surface exterior members 200 are attached. The side surface portion 420 has a groove portion 421 in a long side direction. The groove portions 421 of the left and right side surface portions 420 are provided correspondingly. To the top surface portion 430, the top surface exterior member 300 is attached. As shown in FIG. 4, at a corner portion of the PC 100, end portions of the side surface exterior member 200 and the top surface exterior member 300 are in contact with each other almost as an integrally-formed metal frame when seen by a user.

Note that in the specification, the long side direction of the main surface portion 410, that is, the long side direction of the top surface portion 430 and the bottom surface portion 440 may be called an X axis direction. The short side direction of the main surface portion 410, that is, the long side direction of the side surface portions 420 may be called a Z axis direction. The depth direction of the main surface portion 410 or the display unit 112, that is, the short side direction of the side surface portions 420, the top surface portion 430, and the bottom surface portion 440 may be called a Y axis direction. The surface of the main surface portion 410 on which the display unit 112 is provided out of the front and back surfaces thereof may be called a front surface, and the other surface may be called a back surface.

(Structure of Side Surface External Member)

Next, the structure of the side surface exterior member 200 will be described. Note that the left and right side surface exterior members 200 have the same shape except for the openings for the interfaces, and are attached to the main body 400 in the same manner. So, in the specification hereinbelow, in the case of describing the structure and the like common to the left and right side surface exterior members 200, only the side surface exterior member 200 positioned on the left-hand side when seen by a user, that is, the left-hand side in FIG. 3 will be described.

Figure 5:
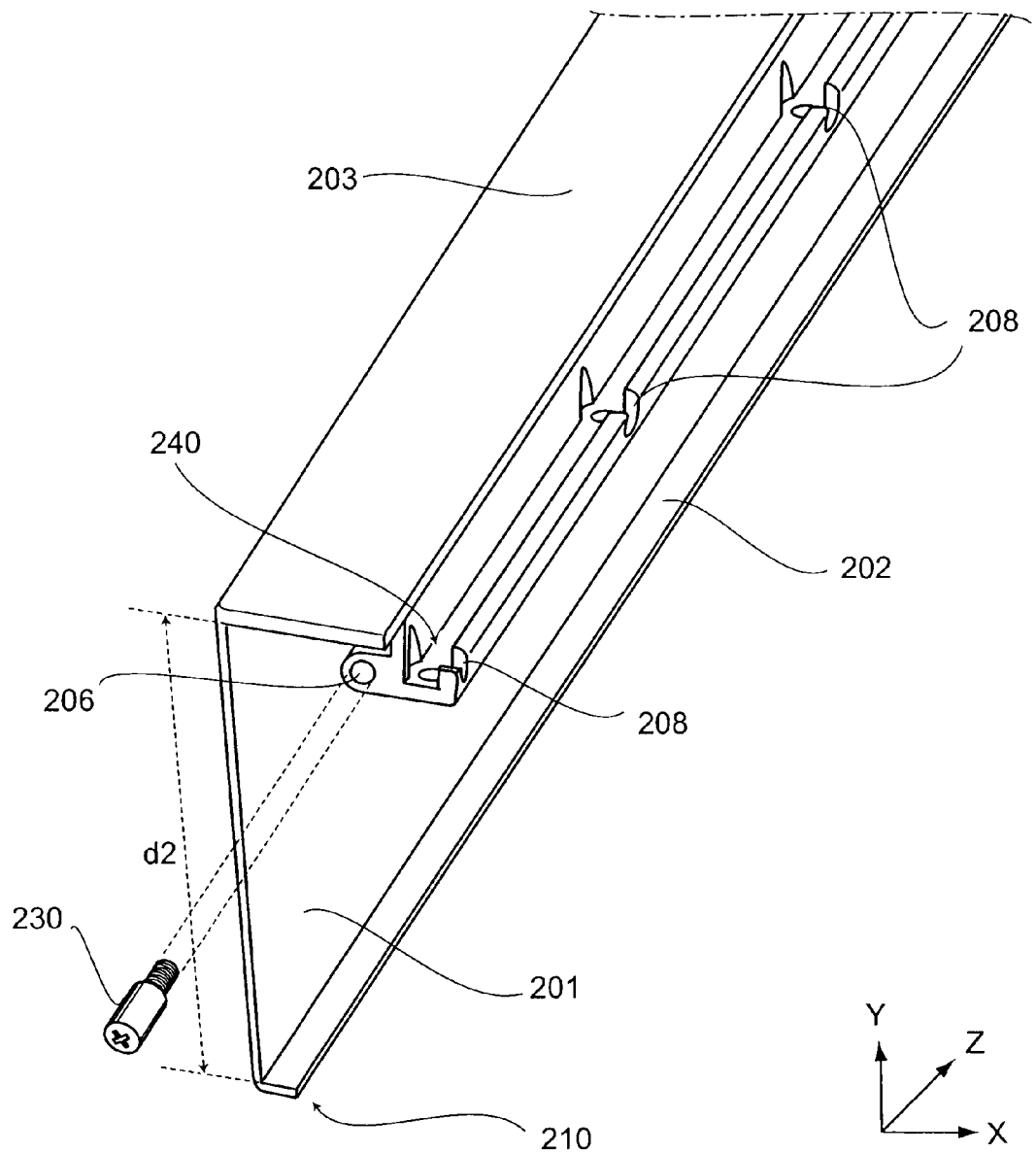
FIG. 5 is an exploded perspective view partially showing an upper portion of the side surface exterior member.
Figure 6:
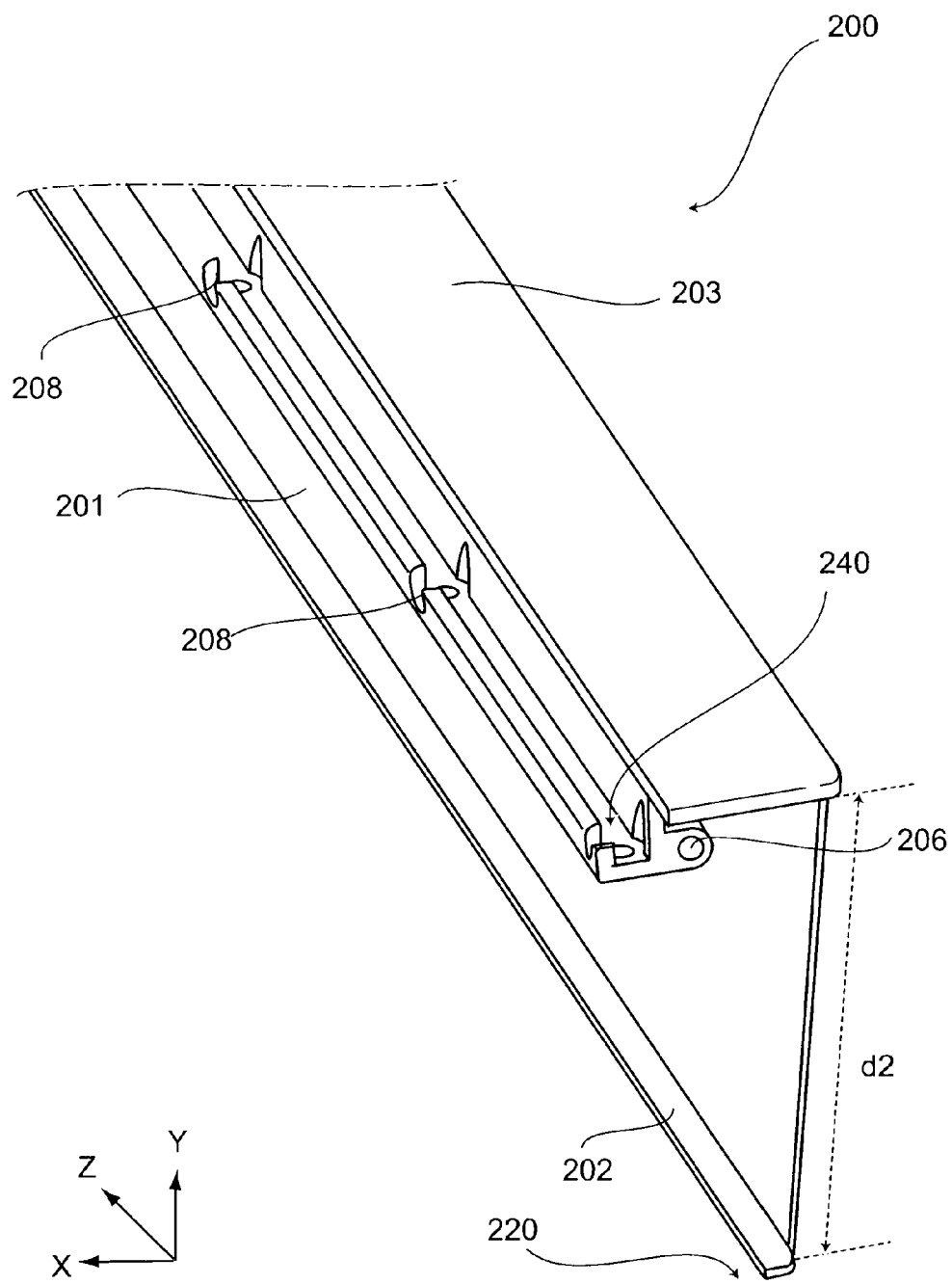
FIG. 6 is a perspective view partially showing a lower portion of the side surface exterior member.

FIG. 5 is an exploded perspective view partially showing an upper portion of the side surface exterior member 200. FIG. 6 is a perspective view partially showing a lower portion of the side surface exterior member 200.

The side surface exterior member 200 has the structure of FIG. 5 at one end and the structure of FIG. 6 at the other end. Specifically, FIG. 5 shows a top end portion 210 located on the top surface portion 430 side when the side surface exterior member 200 is attached to the side surface portion 420 of the base body 400. FIG. 6 shows a bottom end portion 220 located on the bottom surface portion 440 side when the side surface exterior member 200 is attached to the side surface portion 420 of the base body 400. Note that in FIGS. 5 and 6, for simplifying the figures, the openings for the interfaces are omitted.

As shown in FIGS. 5 and 6, the side surface exterior member 200 includes a side surface portion 201, a claw portion 202, a back surface portion 203, and a connection portion 240. The claw portion 202 corresponds to the side surface of the base body 400. The claw portion 202 is engaged with an end portion of the base body 400 in the X axis direction. A main surface of the back surface portion 203 is aligned with the surface of the back cover 114. The connection portion 240 is provided for connecting the side surface exterior member 200 to the base body 400.

The distance d2 of the surface of the side surface portion 201 in contact with the side surface portion 420 in the Y axis direction is substantially the same as the distance d1 (see FIG. 2) of the side surface portion 420 of the base body 400 in the Y axis direction.

The connection portion 240 has screw holes 206 at both end portions in the Z axis direction. The screw holes 206 have openings at end surfaces of the connection portion 240 in the Z axis direction. A dowel pin 230 made of a metal material such as aluminum is inserted to the opening and screwed.

The dowel pin 230 is fixed such that a tip end thereof protrudes outwardly from the opening. Meanwhile, no dowel pin 230 is provided to the screw hole 206 at the bottom end portion 220 (see FIG. 6). The function of the dowel pin 230 provided to the top end portion 210 will be described later. Note that in FIG. 5, to help understand the shape of the side surface exterior member 200, the dowel pin 230 is separated from the side surface exterior member 200.

In the bottom end portion 220 of FIG. 6, the end portions of the side surface portion 201, the claw portion 202, and the back surface portion 203 are subjected to finish processing to be rounded.

The side surface exterior members 200 having the above structure are attached to the side surface portions 420 of the base body 400. The way to attach them will be described later.

(Structure of Top Surface Exterior Member)

Next, the structure of the top surface exterior member 300 will be described.

Figure 11:
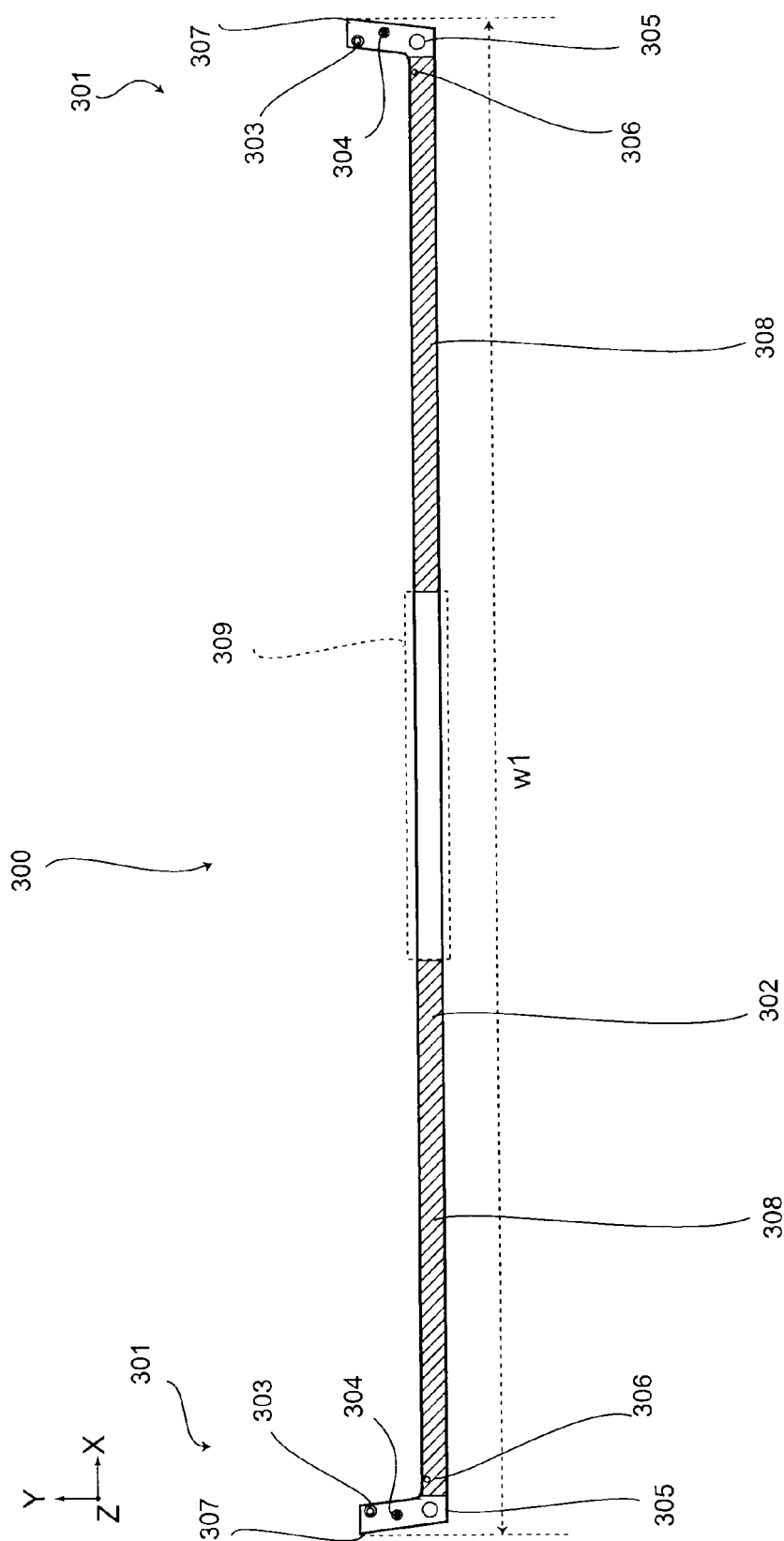
FIG. 11 is a plan view showing the top surface exterior member.
Figure 12:
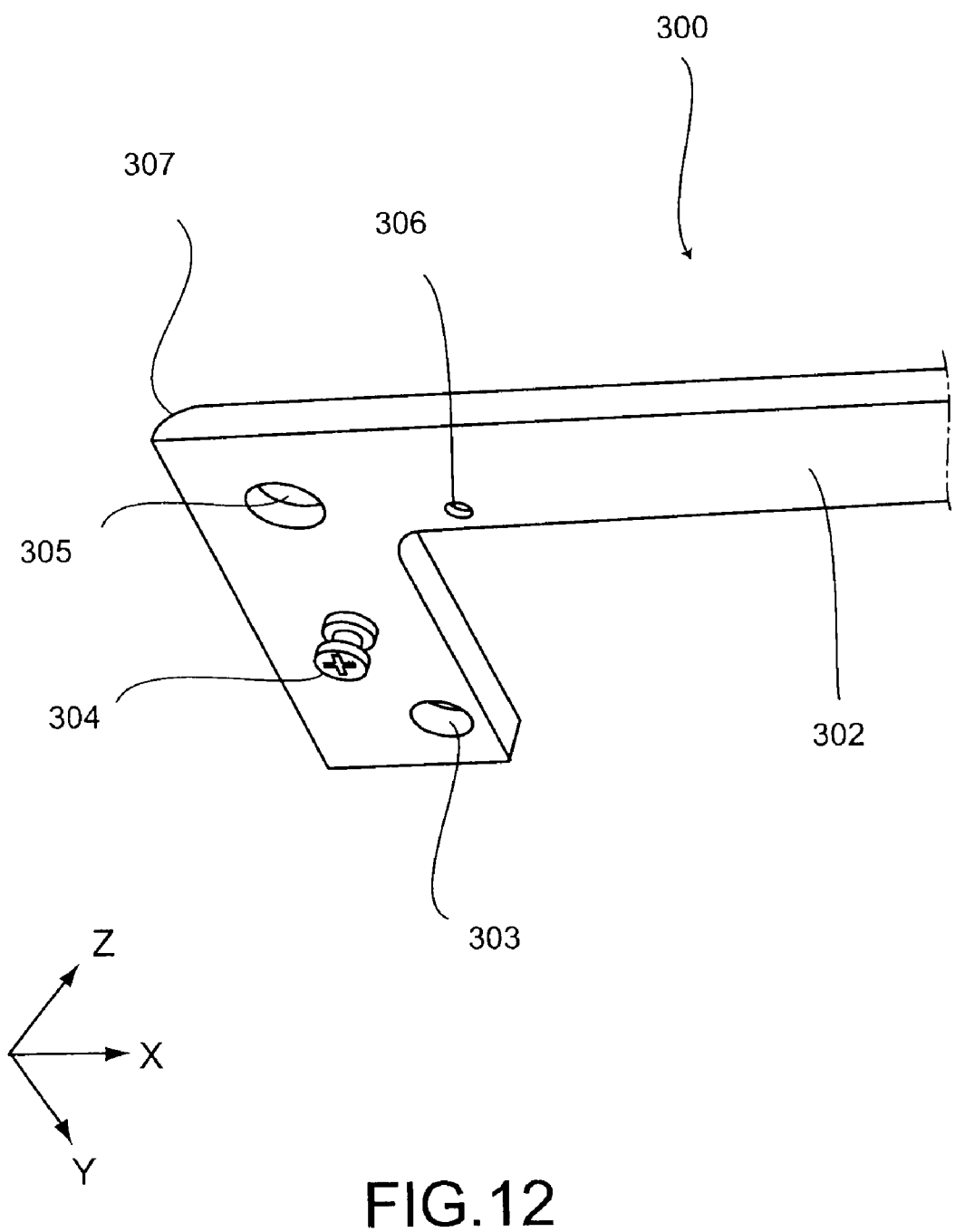
FIG. 12 is a partial perspective view showing the top surface exterior member.
Figure 13:
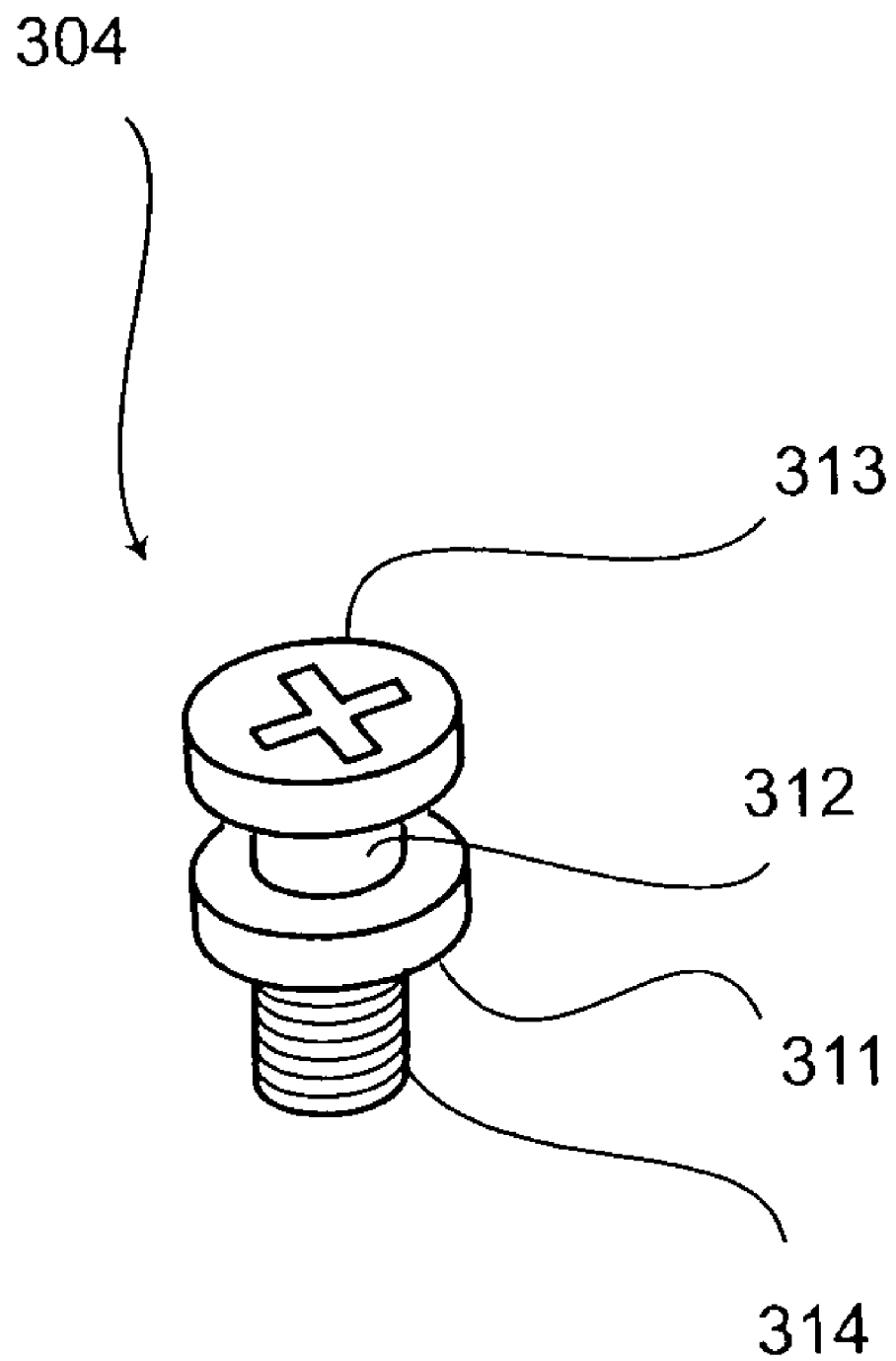
FIG. 13 is a perspective view showing a screw member structuring a protrusion portion provided to the top surface exterior member.

FIG. 11 is a plan view showing the top surface exterior member 300. FIG. 12 is a partial perspective view showing the top surface exterior member 300. FIG. 13 is a perspective view showing a screw member structuring a protrusion portion provided to the top surface exterior member 300.

As shown in FIGS. 11 and 12, the top surface exterior member 300 is elongated in the Z axis direction and has both end portions 301 having an approximate L shape. Each of the both end portions 301 of the top surface exterior member 300 includes a dowel hole portion 303, a protrusion portion 304 (held portion), and a boss receiving hole portion 305 on a surface 302 to be attached to the top surface portion 430 of the main body 400.

Note that as shown in FIG. 11, in the top surface exterior member 300, the left and right portions in the long side direction (X axis direction) are symmetric. So, in the specification hereinafter, in the case of describing the structure and the like common to the left and right end portions 301, only the end portion 301 positioned on the left-hand side when seen by a user, that is, the left-hand side in FIG. 11 will be described.

The dowel hole portion 303 has a tapered inner surface that widens toward the bottom surface (second tapered portion). The depth of the dowel hole portion 303 in the Z axis direction is larger than the protrusion length of the dowel pin 230 protruding from the top surface portion 430. The diameter of the bottom surface of the dowel hole portion 303 is larger than the diameter of the dowel pin 230.

The protrusion portion 304 is provided by screwing, for example, the screw member 310 of FIG. 13 in a screw hole (not shown) provided to the top surface exterior member 300. The screw member 310 is made of a metal material such as aluminum and includes a base portion 311, a column portion 312, a stopper portion 313, and a screw portion 314. By screwing the screw portion 314 in the screw hole (not shown) provided to the top surface exterior member 300, the base portion 311, the column portion 312, and the stopper portion 313 excluding the screw portion 314 are provided to the top surface exterior member 300 as the protrusion portion 304.

The base portion 311 functions as a stopper in the above-mentioned screwing, and defines the length of the protrusion portion 304 in the Z axis direction. The column portion 312 protrudes from the base portion 311 and has a diameter smaller than that of the base portion 311. The stopper portion 313 is provided at a tip end of the column portion 312 and has a diameter larger than that of the column portion 312. The surface of the stopper portion 313 is provided with a groove that is used when being screwed.

The boss receiving hole portion 305 has a diameter larger than that of the opening of the dowel hole portion 303. The dowel hole portion 303, the protrusion portion 304, and the boss receiving hole portion 305 are provided in this order from the back cover 114 side to the display unit 112 side.

The top surface exterior member 300 further includes a screw hole 306. The screw hole 306 is provided closer to the center portion of the top surface exterior member 300 than the end portion 301 is. The screw hole 306 is used to fix the top surface exterior member 300 to the base body 400.

A side end portion 307 of the top surface exterior member 300 is rounded similar to the bottom end portion 220 of the side surface exterior member 200. Accordingly, when the side surface exterior members 200 and the top surface exterior member 300 are attached to the base body 400, the four corner portions of the front surface of the rectangular-shaped PC 100 all have the same round shape, thus improving the appearance of the PC.

The top surface exterior member 300 having the above structure is attached to the top surface portion 430 of the base body 400. The way to attach the top surface exterior member 300 will be described later.

(Structure of Base Body)

Next, the structure of the base body 400 to which the side surface exterior members 200 and the top surface exterior member 300 are attached will be described.

Note that in the base body 400, shapes of attached areas on left- and right-hand sides are similar to the shape of the side surface exterior members 200 and the top surface exterior member 300. So, in the specification hereinafter, in the case of describing the structure and the like common to the left and right side surface portions 420 and the vicinities thereof, only the side surface portion 420 on the left-hand side when seen by a user and the vicinity thereof will be described.

Here, the structure of the base body 400 on the bottom surface portion 440 side will be described.

FIG. 7 is a partial perspective view showing the base body 400 seen from the back surface side.

As shown in FIG. 7, at the corner portion of the back surface side of the base body 400, a notch portion 441, a boss 442 for screwing, and an opening 443 for screwing are provided.

The notch portion 441 is formed by notching an end portion of the bottom surface portion 440 on a side not provided with the rectangular main surface portion 410. The boss 442 is integrally formed with the bottom surface portion 440 in the long side direction thereof (Y axis direction). The opening 443 is provided in the vicinity of the notch portion 441.

Next, the structure of the base body 400 on the top surface portion 430 side will be described.

Figure 14:
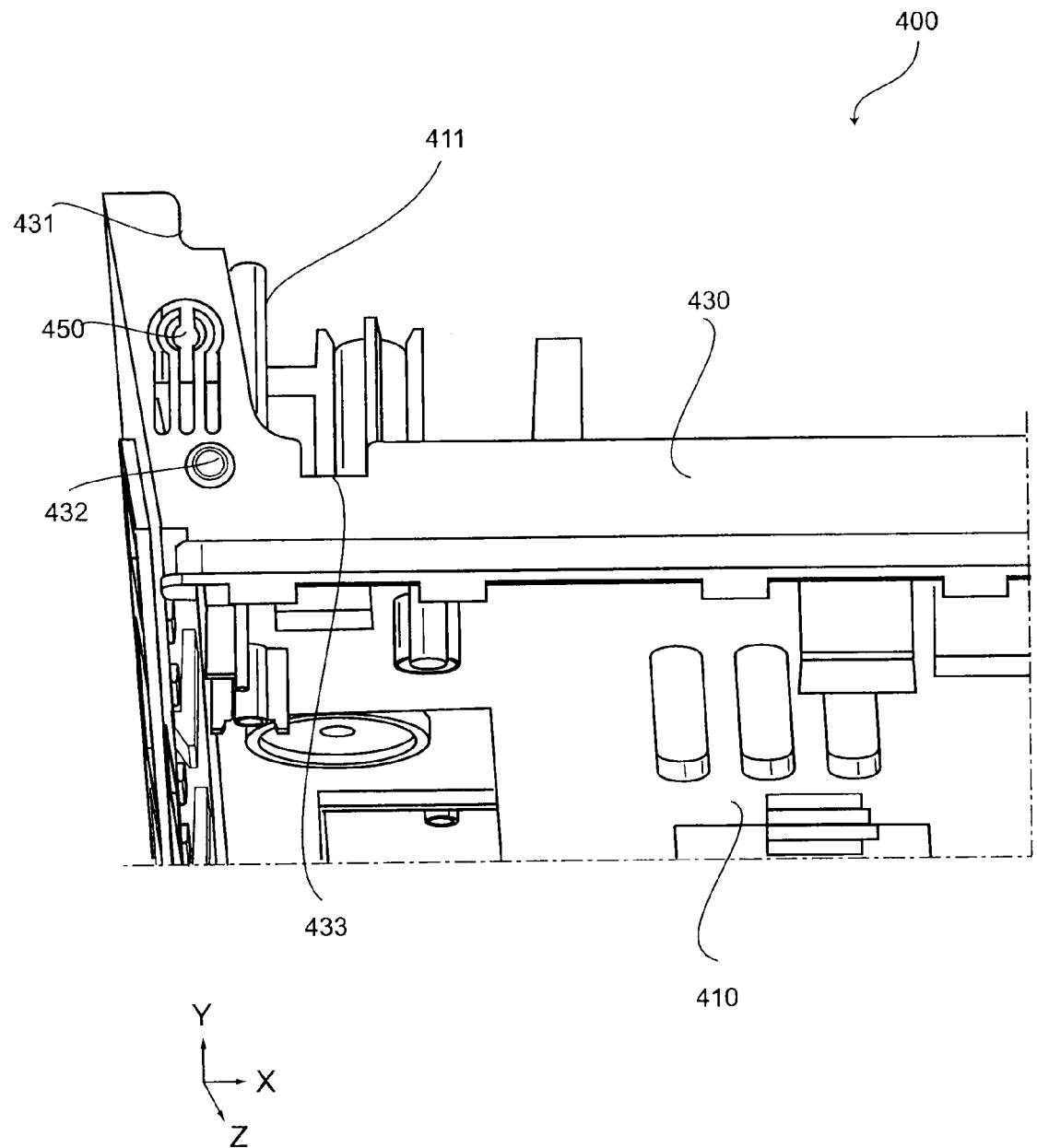
FIG. 14 is a partial perspective view showing the base body.

FIG. 14 is a partial perspective view showing the base body 400. FIG. 15 is a partial perspective view showing the base body 400 attached with the side surface exterior member 200. FIG. 16 is a partially-enlarged view showing an area surrounded by a dashed line in FIG. 15.

As shown in FIGS. 14 and 15, the top surface portion 430 of the base body 400 includes a notch portion 431, an elastic holder 450, a boss portion 432, and a notch portion 433. A boss 411 for screwing is provided to the main surface portion 410, in the vicinity of the top surface portion 430.

The top surface portion 430 is positioned to be lower in the Z axis direction than a plane on which the end portion of the side surface portion 201, the end portion of the claw portion 202, and the end portion of the back surface portion 203 of the side surface exterior member 200 are located. In other words, the side surface portion 201, the claw portion 202, and the back surface portion 203 protrude from the top surface portion 430.

The notch portion 431 is provided such that the dowel pin 230 provided to the side surface exterior member 200 protrudes from the top surface portion 430. That is, the tip end of the dowel pin 230 protrudes from the top surface portion 430 and also from the side surface exterior member 200 when seen in the horizontal direction. Since the dowel pin 230 protrudes from the notch portion 431, the side surface exterior member 200 cannot be easily detached from the base body 400 in the X axis direction.

The boss portion 432 is integrally formed so as to protrude from the top surface portion 430. The tip end of the boss portion 432 protrudes from the side surface exterior member 200 when seen in the horizontal direction. The protrusion length of the boss portion 432 from the top surface portion 430 in the Z axis direction is larger than the protrusion length of the dowel pin 230 from the top surface portion 430 in the Z axis direction. The boss portion 432 has a smaller diameter than the boss receiving hole portion 305 and a protrusion length smaller than the depth of the boss receiving hole portion 305.

The notch portion 433 is provided closer to the center portion of the top surface exterior member 300 than the end portion 301 is. The notch portion 433 has a substantially rectangular shape.

The boss 411 has a shape substantially the same as the boss 442 described above and is provided so as to protrude from the main surface portion 410. By screwing via a notch portion 208 provided closer to the top end portion 210 of the side surface exterior member 200 and the boss 411, the side surface exterior member 200 and the base body 400 support each other.

The elastic holder 450 is formed by notching the top surface portion 430. As shown in FIG. 16, the elastic holder 450 includes an elongated portion 451 and a holder 452.

The elongated portion 451 is formed such that an end portion 458 thereof is continuously formed with the top surface portion 430 of the base body 400. The elongated portion 451 includes two elongated members 453 formed in parallel. The holder 452 is provided at the other end portion of the elongated portion 451.

The holder 452 includes two curved portions 454 respectively provided at tip ends of the two elongated members 453. Each of the two curved portions 454 has an approximate-C-shape in a plan view. Specifically, one end portion of each of the C-shaped curved portions 454 is provided continuous with the elongated member 453, and the other end portions of the curved portions 454 face each other. Since the C-shaped curved portions 454 face each other, the holder 452 is practically annular in a plan view. Note that in describing the holder 452, a space between the C-shaped curved portions 454 facing each other will sometimes be referred to as "opening" for convenience.

The distance between the elastic holder 450 and the top surface portion 430, that is, the width d3 of the area notched to form the elastic holder 450 is, for example, about 1.1 mm.

The holder 452 includes a guide surface portion 455, a tapered portion 456 (first tapered portion), and a hold portion 457.

The guide surface portion 455 is located on the top surface portion 430 side of the holder 452, that is, a side to which the top surface exterior member 300 is attached. The guide surface portion 455 is an inner wall portion formed by vertically notching the holder 452 from its surface in the Z axis direction. The opening surrounded by the guide surface portion 455 has a slightly larger diameter than the stopper portion 313 of the protrusion portion 304.

The tapered portion 456 has a tapered surface formed a slight-step lower than the lower end of the guide surface portion 455. The tapered portion 456 has a larger diameter on the top surface portion 430 side, that is, the side that the top surface exterior member 300 is attached. In short, the holder 452 is formed with the guide surface portion 455 and the tapered portion 456 from the top surface portion 430 side to the main surface portion 410 side so that the opening area of the holder 452 gradually decreases in this direction.

The hold portion 457 is provided at the lower end of the tapered portion 456. The hold portion 457 is an inner wall portion formed by vertically notching the lower end portion of the tapered portion 456, that is, a portion having an opening with a smallest diameter, in the Z axis direction. The inner diameter of the hold portion 457 is slightly larger than that of the column portion 312 of the protrusion portion 304. The length of the hold portion 457 in the Z axis direction is larger than that of the column portion 312 in the Z axis direction.

The elastic holder 450 structured as described above can elastically move in the three directions of the X axis direction, Y axis direction, and Z axis direction with the end portion 458 of the elongated portion 451 formed continuous with the top surface portion 430 as a fulcrum. That is, one elongated member 453 and one curved portion 454 can elastically move in the three directions independent of the other elongated member 453 and the other curved portion 454. Specifically, the elastic holder 450 is structured such that even when the holder 452 moves in the X axis direction in the notched region with the end portion 458 of the elongated portion 451 formed continuous with the top surface portion 430 as a fulcrum, the end portion 458 keeps elasticity without being whitened.

In the base body 400 attached with the side surface exterior members 200 structured as described above, the dowel pin 230, the elastic holder 450, and the boss portion 432 are arranged in the stated order from the back cover 114 side to the display unit 112 side. In the elastic holder 450, the holder 452 is arranged on the dowel pin 230 side, i.e., the back cover 114 side, and the elongated portion 451 is arranged on the boss portion 432 side, i.e., the display unit 112 side.

(Way to Attach Side Surface Exterior Members and Top Surface Exterior Member to Base Body)

Next, the way to attach the side surface exterior members 200 and the top surface exterior member 300 to the base body 400 will be described.

(Way to Attach Side Surface Exterior Members to Base Body)

First, the way to attach the side surface exterior member 200 to the side surface portion 420 of the base body 400 will be described.

Figure 9:
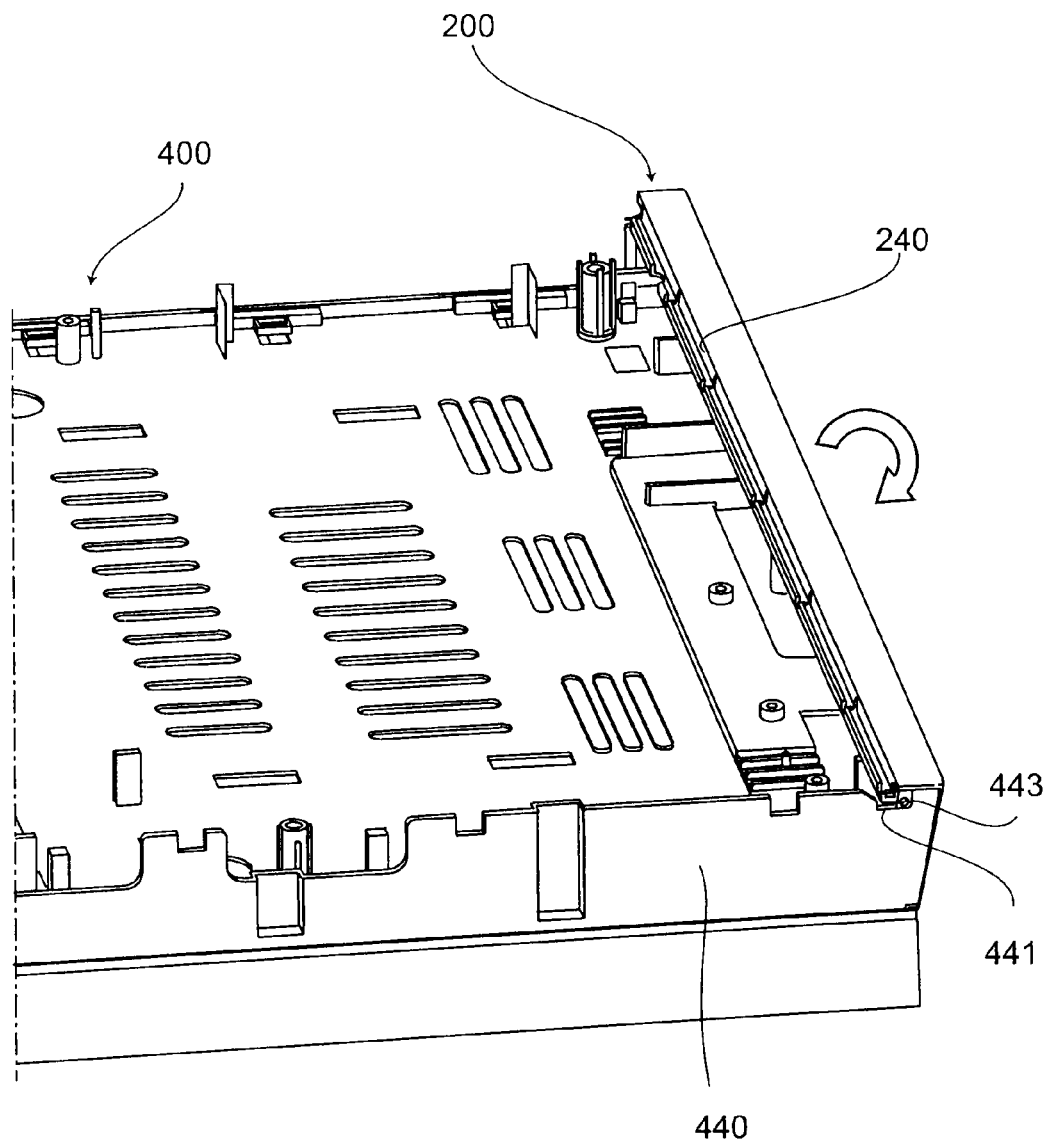
FIG. 9 is a partial perspective view showing a state where the side surface exterior member is being attached to the side surface portion of the base body, the perspective view showing the back surface side of the base body.
Figure 10:
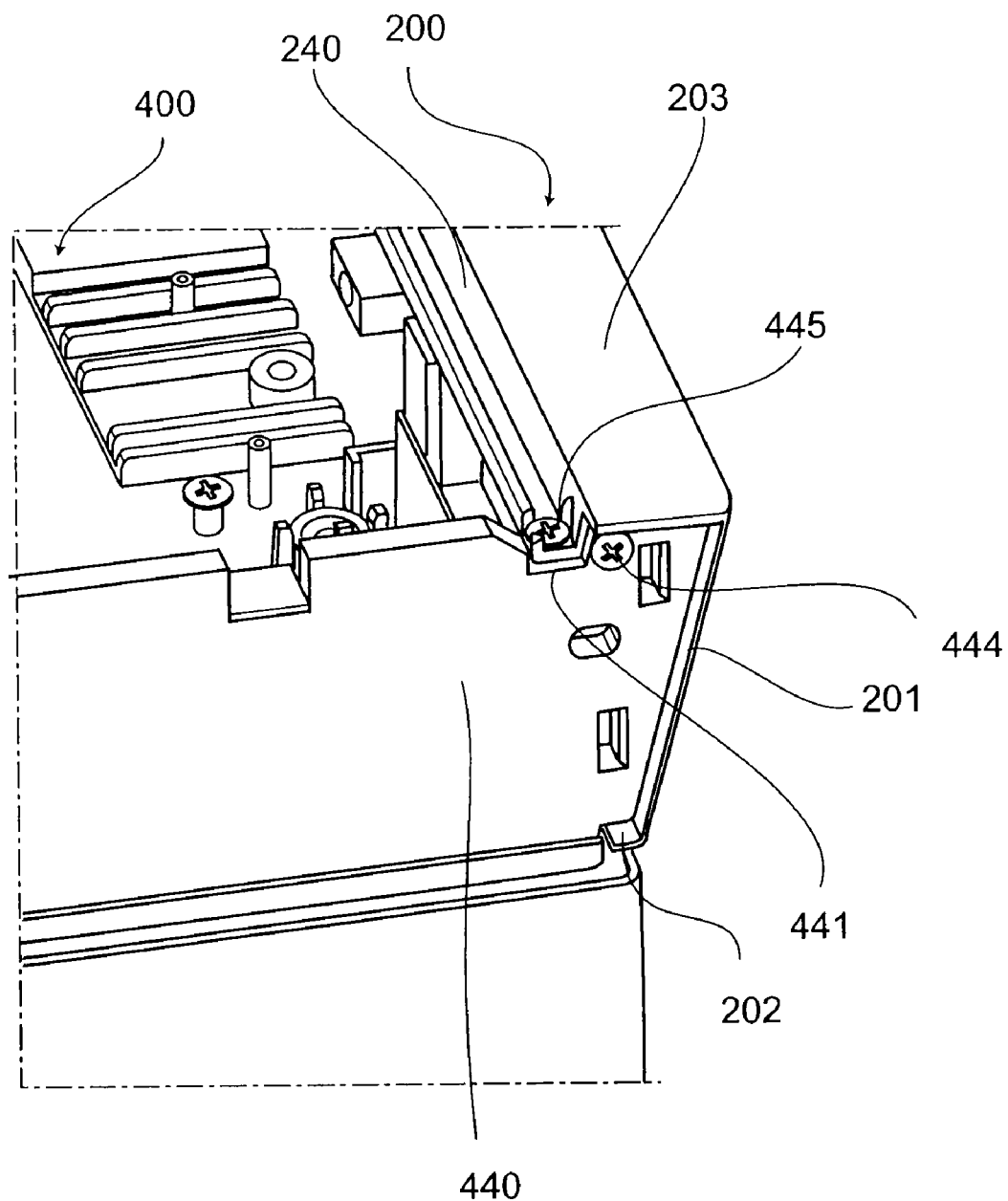
FIG. 10 is a partial perspective view showing the side surface exterior member attached to the side surface portion of the base body.

FIGS. 8 and 9 are partial perspective views showing the way to attach the side surface exterior member 200 to the side surface portion 420 of the base body 400, the perspective views showing the back surface side of the base body 400. FIG. 10 is a partial perspective view showing the side surface exterior member 200 attached to the side surface portion 420 of the base body 400.

As shown in FIG. 8, the back surface portion 203 of the side surface exterior member 200 is inserted to a gap between the side surface portion 420 and the boss 442 of the base body 400 (see FIG. 7). Next, as shown in FIG. 9, the side surface exterior member 200 is rotated around the connection portion 240 so that the side surface portion 201 of the side surface exterior member 200 is brought into contact with the side surface portion 420 of the base body 400. Thus, the claw portion 202 of the side surface exterior member 200 is engaged with the groove portion 421 of the side surface portion 420. Due to the engagement, the side surface exterior member 200 cannot be easily detached from the base body 400 in the X axis direction.

Approximately an entire area of the surface of the side surface portion 201 of the side surface exterior member 200 abutting on the side surface portion 420 of the base body 400 is provided with an adhesive member (not shown) such as a double-sided adhesive tape. That is, when the side surface portion 201 abuts on the side surface portion 420, the side surface portion 201 is adhered to the side surface portion 420 with the adhesive member.

As shown in FIG. 10, when the side surface portion 201 abuts on the side surface portion 420, the side surface exterior member 200 is screwed to the base body 400 at the opening 443 (see FIG. 7) and the screw hole 206 (see FIG. 6) with a screw 444, and at the notch portion 208 (see FIG. 6) on the bottom end portion 220 side and the boss 442 (see FIG. 7) with a screw 445. Accordingly, the side surface exterior member 200 and the base body 400 support each other.

Note that a boss (boss 411 to be described later) similar to the boss 442 is also provided to the top surface portion 430 side of the base body 400. The side surface exterior member 200 is screwed to the base body 400 at the notch portion 208 on the top end portion 210 side and the boss 411.

As described above, the side surface exterior member 200 is attached to the side surface portion 420 of the base body 400.

(Way to Attach Top Surface Exterior Member to Base Body)

Next, the way to attach the top surface exterior member 300 to the top surface portion 430 of the base body 400 attached with the side surface exterior members 200 will be described.

Figure 17:
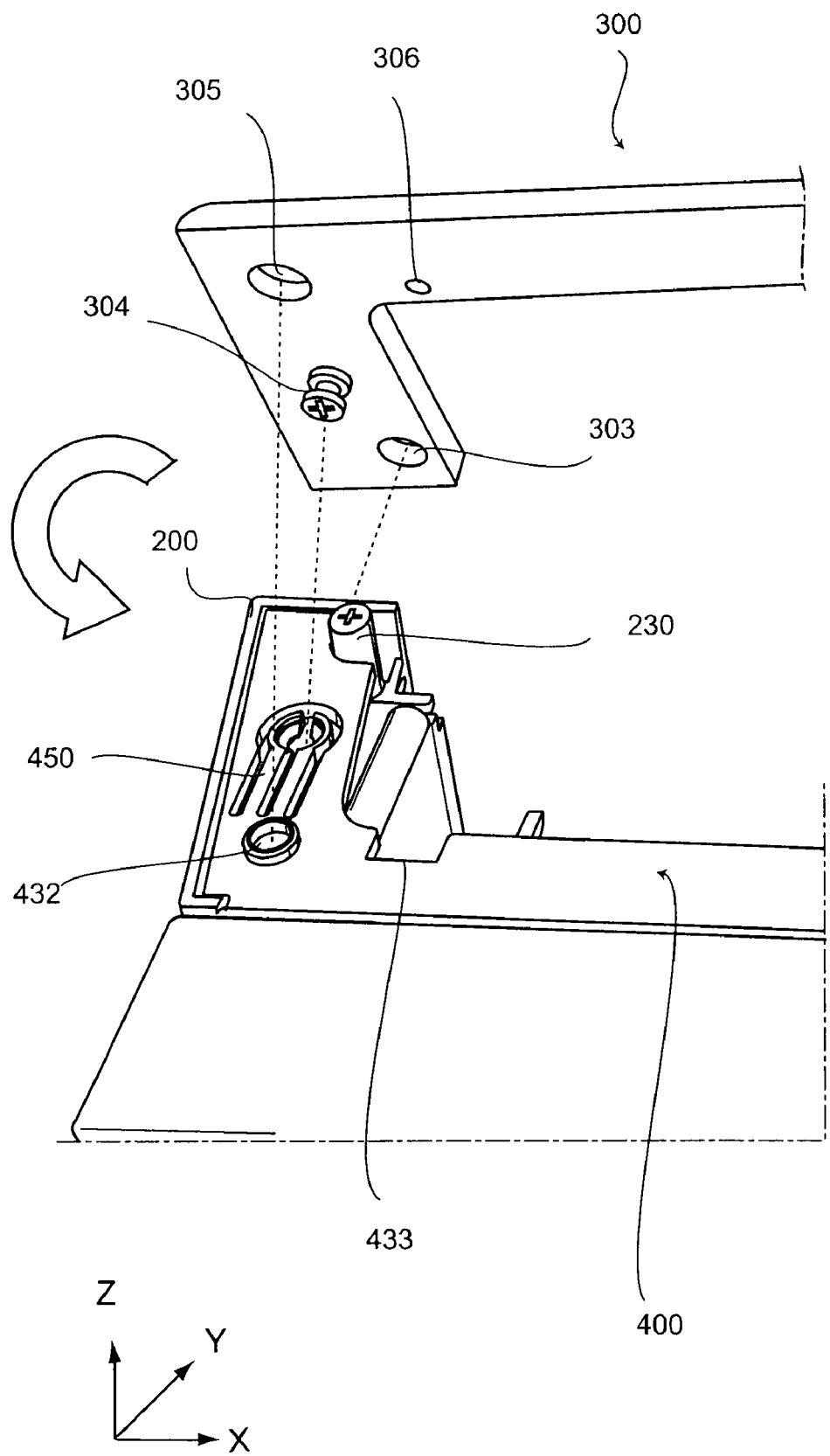
FIG. 17 is a diagram for explaining the way to attach the top surface exterior member to the base body.

FIG. 17 is a diagram for explaining the way to attach the top surface exterior member 300 to the base body 400. FIG. 18 is a cross-sectional view showing the top surface exterior member 300 attached to the base body 400. Note that in this and subsequent cross-sectional views, the dowel pin 230 and the protrusion portion 304 are not hatched for easier understandings.

As shown in FIG. 17, the top surface exterior member 300 is attached to the base body 400 attached with the side surface exterior member 200 from the dowel hole portion 303 side so as to cover the base body 400. First, the dowel pin 230 is engaged with the dowel hole portion 303 to define the position of the top surface exterior member 300 with respect to the base body 400. The top surface exterior member 300 is rotated around the dowel pin 230, as indicated by the arrow, with respect to the base body 400.

Due to the rotation, the stopper portion 313 (see FIG. 13) at the tip end portion of the protrusion portion 304 enters the opening of the holder 452 (see FIG. 16) of the elastic holder 450 to come into contact with the guide surface portion 455. When the stopper portion 313 comes into contact with the tapered portion 456, the stopper portion 313 elastically pushes and widens the elastic holder 450 to thus go under the holder 452 (main surface portion 410 side). In this state, the hold portion 457 loosely holds the column portion 312. The elastic holder 450 that has been pushed and widened is restored to its normal shape shown in FIG. 16 by its elasticity. Thus, the protrusion portion 304 is completely engaged with the elastic holder 450. The protrusion portion 304 is in a state where it cannot be easily pulled out of the elastic holder 450 since the stopper portion 313 is below the holder 452 (main surface portion 410 side) and the elastic holder 450 is restored to its original shape. Specifically, the protrusion portion 304 is elastically held by the elastic holder 450 in the three directions of the X axis direction, the Y axis direction, and the Z axis direction. Moreover, the dowel pin 230, the dowel hole portion 303, and the tapered portion 456 facilitate the assembling operation.

Almost simultaneous with the completion of the engagement between the protrusion portion 304 and the elastic holder 450, the boss portion 432 is engaged with the boss receiving hole portion 305. Since the protrusion length of the boss portion 432 is small as described above, even after the dowel pin 230 is engaged with the dowel hole portion 303 and the protrusion portion 304 is engaged with the elastic holder 450, there is no difficulty in engaging the boss portion 432 with the boss receiving hole portion 305.

As described above, as shown in FIG. 18, the dowel pin 230 is engaged with the dowel hole portion 303, the protrusion portion 304 is engaged with the elastic holder 450, and the boss portion 432 is engaged with the boss receiving hole portion 305.

In FIG. 11, hatched areas 308 on the surface of the top surface exterior member 300 abutting on the top surface portion 430 of the base body 400 are provided with adhesive members (not shown) such as double-sided adhesive tapes. That is, at the center portion of the top surface exterior member 300 in the long side direction (X axis direction), an adhesion prohibition area 309 in which adhesion of the adhesive member is prohibited is provided. When the top surface exterior member 300 abuts on the main surface portion 410, the top surface exterior member 300 is adhered to the main surface portion 410 with the adhesive member.

The notch portion 433 is provided with a metal plate having a plurality of openings (not shown), the metal plate having an L shape in a cross section. The top surface exterior member 300 is screwed to the metal plate through the opening and the screw hole 306. The base body 400 is screwed to the metal plate through the opening and an opening (not shown) provided to the main surface portion 410. The top surface exterior member 300 and the base body 400 thus support each other.

As described above, the top surface exterior member 300 is attached to the base body 400 attached with the side surface exterior members 200. Since the side surface exterior member 200 slightly protrudes from the top surface portion 430 of the base body 400, the side end portion 307 of the top surface exterior member 300 abuts on the end portion of the side surface exterior member 200. Accordingly, as shown in FIG. 4, the top surface exterior member 300 and the side surface exterior member 200 are brought into contact with each other as if they are an integrally-formed metal frame when seen by a user. That is, as shown in the oval in a dashed line, the top surface exterior member 300 and the side surface exterior member 200 are in contact with each other without any gap therebetween.

The top surface exterior member 300 and the side surface exterior member 200 each made of a metal material are coupled by the dowel pin 230 made of a metal material. Accordingly, the top surface exterior member 300 and the side surface exterior member 200 are grounded via the dowel pin 230.

As described above, the PC 100 is structured by attaching the top surface exterior member 300 to the top surface portion 430 of the base body 400 attached with the side surface exterior members 200.

(Change of Shape of PC Due to Change of Temperature Etc.)

Hereinafter, changes of the shape of the PC 100 structured as described above due to changes of temperature and the like will be described.

The coefficient of linear thermal expansion of aluminum forming the side surface exterior members 200 and the top surface exterior member 300 is $23.4 \times 10^{-6}$ mm/mm/° C. The coefficient of linear thermal expansion of a PC/ABS alloy resin forming the base body 400 is $70 \times 10^{-6}$ mm/mm/° C. Due to the difference between the coefficients of linear thermal expansion, when the temperature increases/decreases, the side surface exterior members 200 and the top surface exterior member 300, and the base body 400 expand/contract by the different coefficients of linear thermal expansion. In other words, due to the difference between the coefficient of linear thermal expansion of the side surface exterior member 200 and the top surface exterior member 300 and that of the base body 400, the shape of the PC 100 inevitably changes.

(Change of Shape of PC Due to Increase of Temperature)

Figure 21:
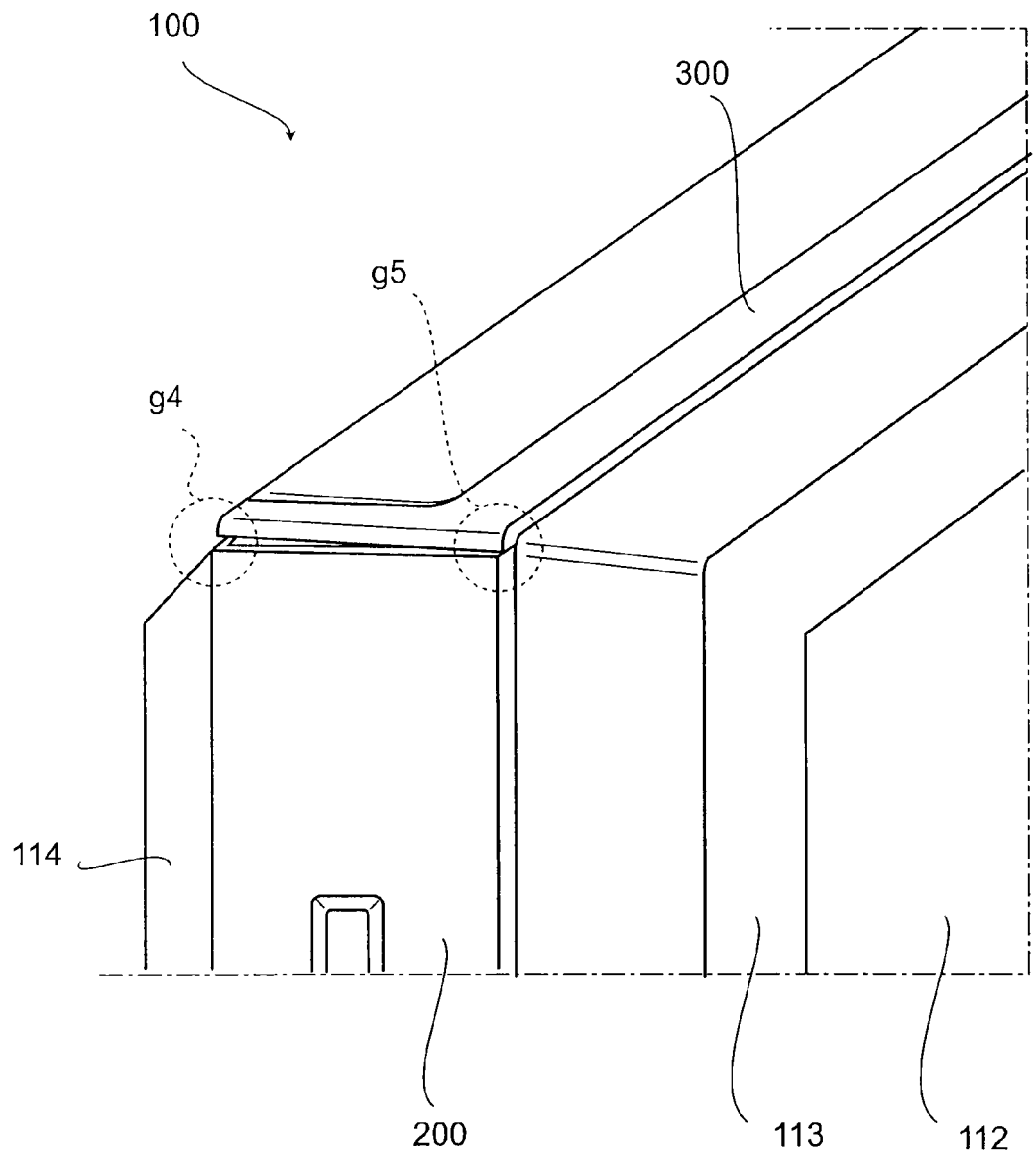
FIG. 21 is a partial perspective view showing the change of the shape of the PC due to the increased temperature.

FIG. 19 are XZ cross-sectional views each showing a portion of the PC 100 including the dowel pin 230, the dowel hole portion 303, and the like for explaining the change of the shape of the PC 100 due to an increased temperature. FIG. 20 are XZ cross-sectional views each showing a portion of the PC 100 including the protrusion portion 304, the holder 452 of the elastic holder 450, and the like for explaining the change of the shape of the PC 100 due to the increased temperature. FIG. 21 is a partial perspective view showing the change of the shape of the PC 100 due to the increased temperature. Note that in these and subsequent figures, to help understand the description, the shape and size of the components in the figures for explaining the change of the shape are somewhat different from the actual shape and size thereof.

First, a case where the temperature is increased will be described. Specifically, a case where the temperature is increased from 17° C. to 35° C. will be described.

In this case, in a case where the top surface exterior member 300 has a width w1 of 662 mm in the X axis direction, the top surface exterior member 300 expands by about 0.28 mm ($=23.4 \times 10^{-6} \times 662 \times (35-17)$) in the X axis direction. In a case where the base body 400 has a width w2 of 659 mm in the X axis direction, the base body 400 expands by about 0.8 mm ($=70 \times 10^{-6} \times 659 \times (35-17)$) in the X axis direction. That is, the difference of expansion amount between the base body 400 and the top surface exterior member 300 is approximately 0.52 mm ($=0.8-0.28$), theoretically. When the center portion of the PC 100 in the X axis direction is assumed to be a center of the expansion, it is considered that the expansion difference in each of the left and right end portions of the PC 100 is about 0.26 mm (=0.52/2), theoretically.

Note that since the length of the PC 100 in the X axis direction is largest among the three directions and the expansion difference in each of the left and right end portions of the PC 100 is 0.26 mm, the expansion differences in the Y axis direction and the Z axis direction in which the length of the PC is smaller than in the X axis direction are theoretically less than 0.26 mm, which is an extremely small amount. Thus, assuming that the expansion differences in the Y axis direction and the Z axis direction can be neglected theoretically although the expansion differences actually exist in the Y axis direction and the Z axis direction, in the specification, the expansion differences in the Y axis direction and the Z axis direction will not be described unless particularly mentioned. In short, in the specification, the expansion of the top surface exterior member 300 and the base body 400 in the X axis direction will mainly be described. Note that the expansion differences between the top surface exterior member 300 and the base body 400 at the left and right end portions are considered to be the same. So, as in the above descriptions, only the portion on the left-hand side when seen by a user will be described.

The change of the shape of the PC 100 in the case where, as described above, the expansion difference in the X axis direction is 0.26 mm will be described.

Figure 19A:
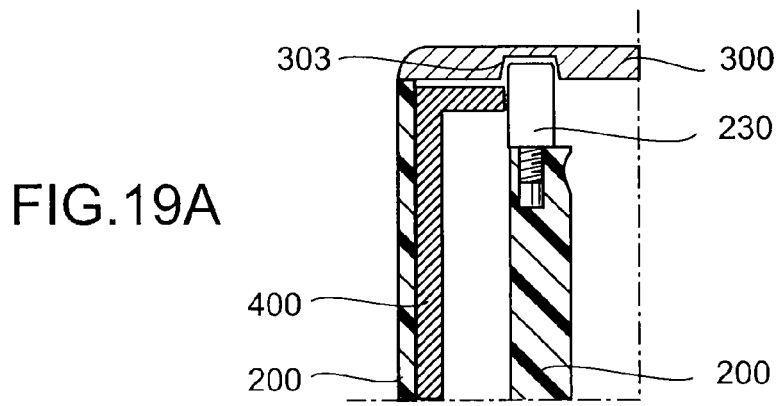
FIG. 19 are cross-sectional views each showing a portion of the PC for explaining the change of the shape of the PC due to an increased temperature.

FIG. 19A is the PC 100 in the state where the temperature has not increased, that is, the shape of the PC 100 has not changed. In this state, the members are located at normal positions.

Figure 19B:
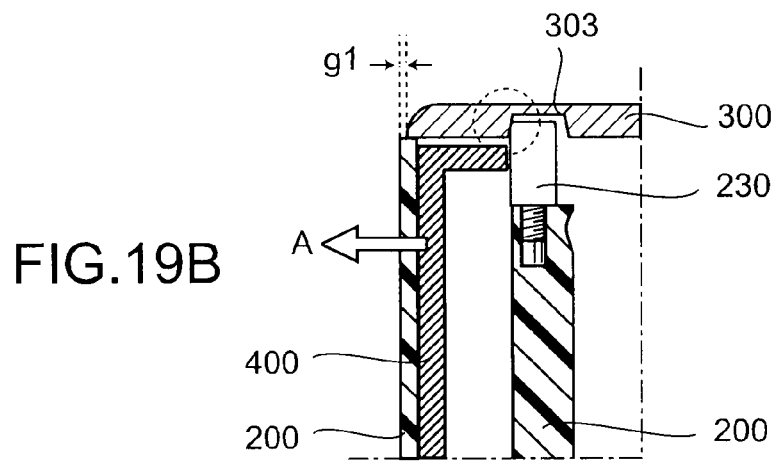

When the temperature increases, the shape of the PC 100 first changes as shown in FIG. 19B. That is, the base body 400 expands in the X axis direction. The entire area of the side surface portion 201 of the side surface exterior member 200 positioned in the Y axis direction is adhered to the side surface portion 420 of the base body 400. So, the side surface exterior member 200 moves in the X axis direction as the base body 400 expands in the X axis direction.

Meanwhile, the top surface exterior member 300 also expands in the X axis direction. Due to the thermal expansion difference between the top surface exterior member 300 and the base body 400 or the like, the base body 400 in appearance expands in the X axis direction (arrow A). As a result, the base body 400 is positioned on an outer side than the end portion of the top surface exterior member 300 only by g1 (g1<0.26). As shown in an area surrounded by a circle in a dashed line, the dowel pin 230 is in contact with the inner wall of the dowel hole portion 303.

Note that the phrase "in appearance" in the specification refers to, for example, a case where, while both the top surface exterior member 300 and the base body 400 expand in actuality, since the expansion amount of the base body 400 is larger, it can be considered that only the base body 400 is expanding in view of the thermal expansion difference thereof. The above interpretation can simplify the description and causes no problem in theory, so hereinafter, the phrase "in appearance" will be used for the same interpretation.

Figure 19C:
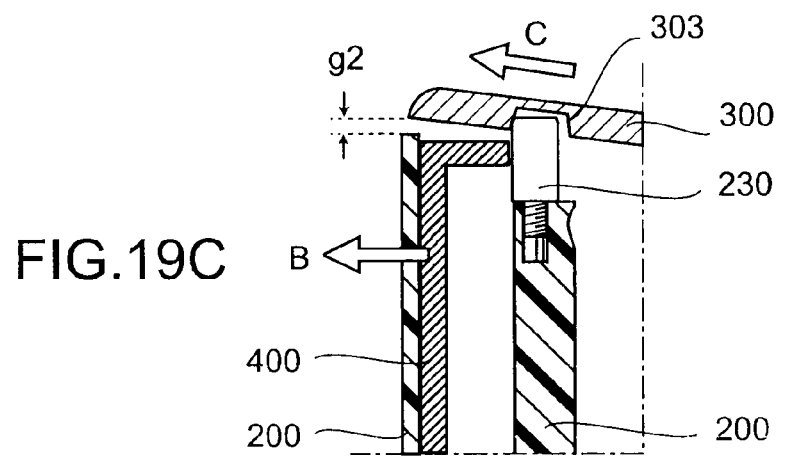

As shown in FIG. 19C, when the temperature further increases, the base body 400 in appearance expands additionally in the X axis direction (arrow B). As a result, the dowel pin 230 moves along the tapered inner wall of the dowel hole portion 303. Accordingly, the top surface exterior member 300 is lifted upward above the dowel pin 230 (arrow C), and a gap g2 in the Z axis direction is generated between the top surface exterior member 300 and the side surface exterior member 200.

As the shape of the portion of the PC 100 in the vicinity of the dowel pin 230 and the dowel hole portion 303 changes, the shape of the portion of the PC 100 in the vicinity of the protrusion portion 304 and the elastic holder 450 changes as follows.

FIG. 20A shows the portion of the PC 100 in the vicinity of the protrusion portion 304 and the elastic holder 450 in the state of FIG. 19A. Here, the members are located at the normal positions. The holder 452 of the elastic holder 450 is provided with the notched region having the width d3 at the outer circumference. As described above, the width d3 is approximately 1.1 mm, for example.

In the state of FIG. 19B, the shape of the portion of the PC 100 in the vicinity of the protrusion portion 304 and the elastic holder 450 changes as shown in FIG. 20B. As in FIG. 19B, the base body 400 in appearance expands in the X axis direction (arrow A). As a result, the base body 400 is positioned on an outer side than the end portion of the top surface exterior member 300 in the X axis direction only by g1 (g1<0.26).

While the base body 400 in appearance expands in the X axis direction (arrow A), the protrusion portion 304 of the top surface exterior member 300 does not follow the expansion of the base body 400. Thus, in the elastic holder 450, while the holder 452 holds the protrusion portion 304, the end portion 458 of the elongated portion 451 continuously formed with the base body 400 moves in the X axis direction as the base body 400 expands. Under the condition of g1<0.26 and d3=1.1, g1<d3×2 is established. That is, the elastic holder 450 can move in the X axis direction in the notched region having the width d3. Note that the notched region having the width d3 of 1.1 mm can absorb the change of the shape due to increased temperature up to, in theory, 89° C. (=(1.1×2)/{(70×10$^{-6}$× 659)−(23.4×10$^{-6}$×662)}+17).

In the state of FIG. 19C, the shape of the portion of the PC 100 in the vicinity of the protrusion portion 304 and the elastic holder 450 changes as shown in FIG. 20C. That is, similar to FIG. 19C, the base body 400 in appearance further expands in the X axis direction (arrow B). As a result, since the gap g2 (see FIG. 19C) in the Z axis direction is generated between the top surface exterior member 300 and the side surface exterior member 200 as described above, a gap g3 in the Z axis direction is also generated between the top surface exterior member 300 and the side surface exterior member 200 in the vicinity of the protrusion portion 304.

Focusing on the elastic holder 450, the holder 452 holding the protrusion portion 304 mainly moves in the Z axis direction as the top surface exterior member 300 moves in the Z axis direction. Meanwhile, since the end portion 458 of the elongated portion 451 is continuously formed with the base body 400, the end portion 458 does not move in the Z axis direction. Accordingly, the elastic holder 450 tilts such that the end portion 458 is located on a lower side and the tip end of the holder 452 is located on a higher side. That is, the end portion 458, the holder 452, and the dowel hole portion 303 are arranged in the stated order from the lower side to the higher side in the Z axis direction. In short, g3<g2 is established.

In the elastic holder 450, since the end portion 458 is continuously formed with the base body 400 and the holder 452 holds the protrusion portion 304, even when the dowel pin 230 is moved from the normal position and has completely passed the dowel hole portion 303, the base body 400 and the top surface exterior member 300 are still coupled with each other.

In the state of FIGS. 19C and 20C, the outer appearance of the PC 100 is as shown in FIG. 21. Focusing on the portion where the side surface exterior member 200 and the top surface exterior member 300 are normally in contact with each other (oval in dashed line of FIG. 4), the side surface exterior member 200 is located slightly on an outer side than the end portion of the top surface exterior member 300 in the X axis direction. In the Z axis direction, the top surface exterior member 300 tilts such that the portion on the display unit 112 side is located on a lower side and the portion on the back cover 114 side is located on a higher side. Accordingly, a gap g4 is generated on the back cover 114 side, and a gap g5 is generated on the display unit 112 side (g4>g5). The boss portion 432 engaged with the boss receiving hole portion 305 serves as a fulcrum of the top surface exterior member 300 tilting with respect to the base body 400.

When a user sees the PC 100 from the display unit 112 side, the side surface exterior member 200 is slightly deviated outwardly from the top surface exterior member 300 in the X axis direction. However, the deviation is merely about 0.26 mm, which is hardly recognized by the user.

While the gap g4 is generated in the Z axis direction between the top surface exterior member 300 and the side surface exterior member 200 on the back cover 114 side, the gap g5 on the display unit 112 side is extremely small. Accordingly, even when a user sees the PC 100 from the display unit 112 side, the gap g4 cannot be recognized by the user. Since the user sees the tilting top surface exterior member 300 from the fulcrum side, the gap between the top surface exterior member 300 and the base body 400 in the Z axis direction cannot be recognized by the user.

As described above, this embodiment has a precondition that the shape of the PC 100 changes due to the thermal expansion difference of the side surface exterior member 200 and the top surface exterior member 300 from the base body 400. This embodiment is made based on the concept of structuring the PC 100 while accepting the change of the shape of the PC 100 and making the gap between the side surface exterior member 200 and the top surface exterior member 300 inconspicuous.

Next, how the members return to the normal positions will be described. As the temperature decreases, the expanded base body 400 and top surface exterior member 300 contract. Accordingly, the dowel pin 230 of FIG. 19C returns to the normal position (FIG. 19A) along the tapered inner wall of the dowel hole portion 303. The top surface exterior member 300 also returns to the normal position, and the gap g2 in the Z axis direction disappears. The elastic holder 450 of FIG. 20C also returns to the normal position (FIG. 20A) with the elastic force. The boss portion 432 engaged with the boss receiving hole portion 305 serves as a fulcrum for restoration of the top surface exterior member 300 with respect to the base body 400.

(Change of Shape of PC Due to Decrease of Temperature)

Hereinafter, the change of the shape of the PC 100 due to the decreased temperature will be described.

FIG. 22 are XZ cross-sectional views each showing a portion of the PC 100 including the dowel pin 230, the dowel hole portion 303, and the like for explaining the change of the shape of the PC 100 due to a decreased temperature. FIG. 23 are XZ cross-sectional views each showing a portion of the PC 100 including the protrusion portion 304, the holder 452 of the elastic holder 450, and the like for explaining the change of the shape of the PC 100 due to the decreased temperature. FIG. 24 is a partial perspective view showing the change of the shape of the PC 100 due to the decreased temperature.

A case where the temperature is decreased from 17° C. to 5° C. will be described. In this case, the top surface exterior member 300 contracts by about 0.19 mm (=23.4×10$^{-6}$×662× (17−5)) in the X axis direction. The base body 400 contracts by about 0.55 mm (=70×10$^{-6}$×659×(17−5)) in the X axis direction. That is, the difference of contraction amount between the base body 400 and the top surface exterior member 300 is approximately 0.36 mm (=0.55−0.19), theoretically. Therefore, it is considered that the contraction difference in each of the left and right end portions of the PC 100 is about 0.18 mm 0.36/2), theoretically.

Note that since the contraction difference in each of the left and right end portions of the PC 100 is 0.18 mm in the X axis direction, the contraction differences in the Y axis direction and the Z axis direction in which the length of the PC 100 is smaller than in the X axis direction are theoretically less than 0.18 mm, which is an extremely small amount. Thus, assuming that the contraction differences in the Y axis direction and the Z axis direction can be neglected theoretically although the contraction differences actually exist in the Y axis direction and the Z axis direction, in the specification, the contraction differences in the Y axis direction and the Z axis direction will not be described unless particularly mentioned.

The change of the shape of the PC 100 in the case where, as described above, the contraction difference in the X axis direction is 0.18 mm will be described.

Figure 22A:
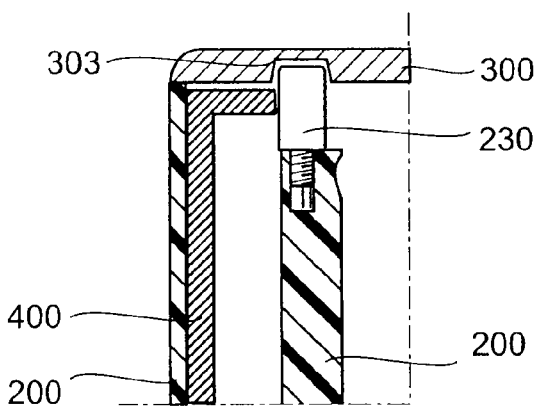
FIG. 22 are cross-sectional views each showing a portion of the PC for explaining the change of the shape of the PC due to a decreased temperature.

FIG. 22A is the PC 100 in the state where the temperature has not decreased, that is, the shape of the PC 100 has not changed. In this state, the members are located at the normal positions.

Figure 22B:
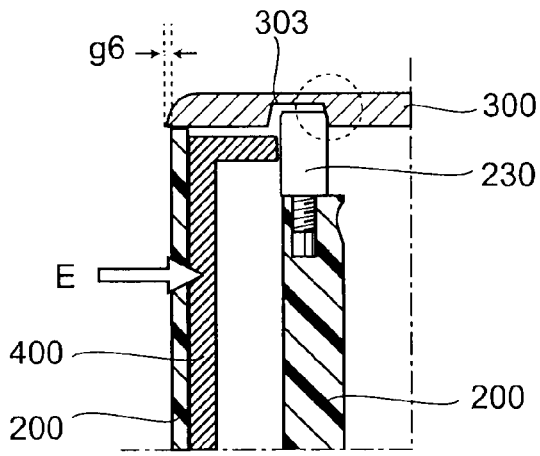

When the temperature decreases, the shape of the PC 100 first changes as shown in FIG. 22B. That is, the base body 400 contracts in the X axis direction (arrow E). The side surface exterior member 200 moves in the X axis direction as the base body 400 contracts in the X axis direction. As a result, the base body 400 is located on an inner side than the end portion of the top surface exterior member 300 in the X axis direction only by g6 (g6<0.18). As shown in an area surrounded by a circle in a dashed line, the dowel pin 230 is in contact with the inner wall of the dowel hole portion 303.

Figure 22C:
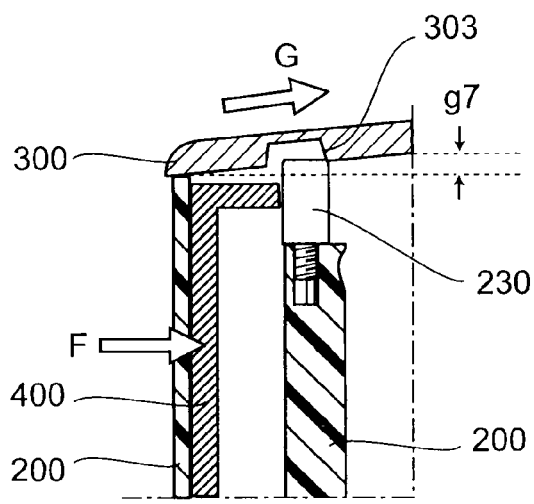

As shown in FIG. 22C, when the temperature further decreases, the base body 400 in appearance contracts additionally in the X axis direction (arrow F). As a result, the dowel pin 230 moves along the tapered inner wall of the dowel hole portion 303. Accordingly, the top surface exterior member 300 is lifted upward above the dowel pin 230 (arrow G), and a gap g7 in the Z axis direction is generated between the top surface exterior member 300 and the side surface exterior member 200.

Since the end portions of the top surface exterior member 300 are located on a lower side, the shape of the top surface exterior member 300 changes such that the center portion thereof floats. Because the center portion of the top surface exterior member 300 has the adhesion prohibition area 309, the adhesive member is not peeled off and the PC 100 can change its shape without difficulty. Further, when the temperature increases and the members return to the normal positions, re-adhesion of a peeled adhesive member to the base body 400 does not occur. So, the top surface exterior member 300 can return to the normal position.

As the shape of the portion of the PC 100 in the vicinity of the dowel pin 230 and the dowel hole portion 303 changes, the shape of the portion of the PC 100 in the vicinity of the protrusion portion 304 and the elastic holder 450 changes as follows.

Figure 23A:
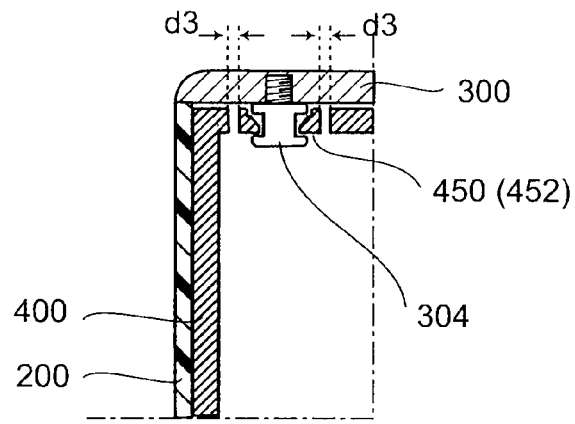
FIG. 23 are other cross-sectional views each showing a portion of the PC for explaining the change of the shape of the PC due to the decreased temperature.
Figure 24:
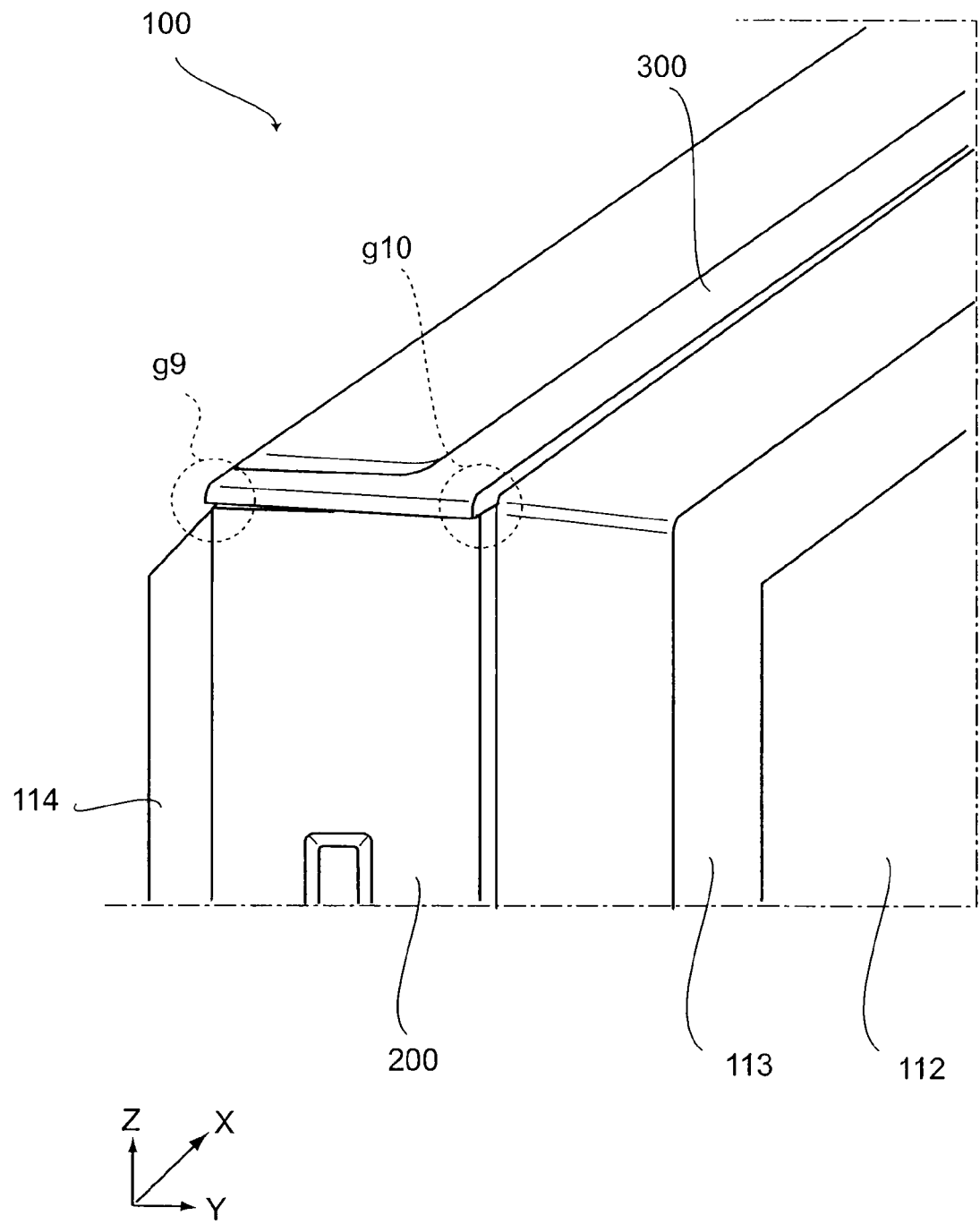
FIG. 24 is a partial perspective view showing the change of the shape of the PC due to the decreased temperature.

FIG. 23A shows the portion of the PC 100 in the vicinity of the protrusion portion 304 and the elastic holder 450 in the state of FIG. 22A. Here, the members are located at the normal positions. The holder 452 of the elastic holder 450 is provided with the notched region having the width d3 at the outer circumference. As described above, the width d3 is approximately 1.1 mm, for example.

Figure 23B:
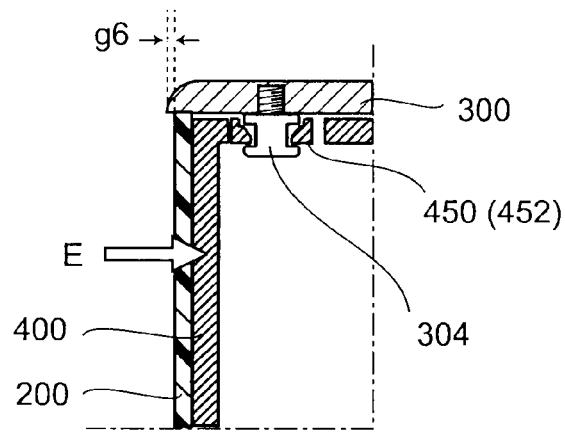

In the state of FIG. 22B, the shape of the portion of the PC 100 in the vicinity of the protrusion portion 304 and the elastic holder 450 changes as shown in FIG. 23B. As in FIG. 22B, the base body 400 in appearance contracts in the X axis direction (arrow E). As a result, the base body 400 is located on an inner side than the end portion of the top surface exterior member 300 in the X axis direction only by g6 (g6<0.18).

While the base body 400 in appearance contracts in the X axis direction (arrow E), the protrusion portion 304 of the top surface exterior member 300 does not follow the contraction of the base body 400. Thus, in the elastic holder 450, while the holder 452 holds the protrusion portion 304, the end portion 458 of the elongated portion 451 continuously formed with the base body 400 moves in the X axis direction as the base body 400 contracts. Under the condition of g6<0.18 and d3=1.1, g6<d3×2 is established. That is, the elastic holder 450 can move in the X axis direction in the notched region having the width d3.

Figure 23C:
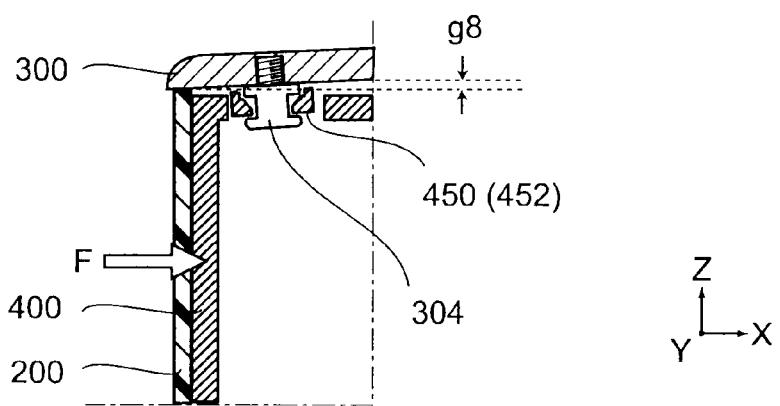

In the state of FIG. 22C, the shape of the portion of the PC 100 in the vicinity of the protrusion portion 304 and the elastic holder 450 changes as shown in FIG. 23C. That is, similar to FIG. 22C, the base body 400 in appearance contracts further in the X axis direction (arrow F). As a result, since the gap g7 (see FIG. 22C) in the Z axis direction is generated between the top surface exterior member 300 and the side surface exterior member 200 as described above, a gap g8 in the Z axis direction is also generated between the top surface exterior member 300 and the side surface exterior member 200 in the vicinity of the protrusion portion 304.

Focusing on the elastic holder 450, the holder 452 holding the protrusion portion 304 mainly moves in the Z axis direction as the top surface exterior member 300 moves in the Z axis direction. Meanwhile, since the end portion 458 of the elongated portion 451 is continuously formed with the base body 400, the end portion 458 does not move in the Z axis direction. Accordingly, the elastic holder 450 tilts such that the end portion 458 is located on a lower side and the tip end of the holder 452 is located on a higher side. That is, the end portion 458, the holder 452, and the dowel hole portion 303 are arranged in the stated order from the lower side to the higher side in the Z axis direction. In short, g8<g7 is established.

In the elastic holder 450, since the end portion 458 is continuously formed with the base body 400 and the holder 452 holds the protrusion portion 304, even when the dowel pin 230 is moved from the normal position and has completely passed the dowel hole portion 303, the base body 400 and the top surface exterior member 300 are still coupled with each other.

In the state of FIGS. 22C and 23C, the outer appearance of the PC 100 is as shown in FIG. 24. Focusing on the portion where the side surface exterior member 200 and the top surface exterior member 300 are normally in contact with each other (oval in dashed line of FIG. 4), the side surface exterior member 200 is located slightly on an inner side than the end portion of the top surface exterior member 300 in the X axis direction. In the Z axis direction, the top surface exterior member 300 tilts such that the portion on the display unit 112 side is located on a lower side and the portion on the back cover 114 side is located on a higher side. Accordingly, a gap g9 is generated on the back cover 114 side, and a gap g10 is generated on the display unit 112 side (g9>g10). The boss portion 432 engaged with the boss receiving hole portion 305 serves as a fulcrum of the top surface exterior member 300 tilting with respect to the base body 400.

When a user sees the PC 100 from the display unit 112 side, the side surface exterior member 200 is slightly deviated inwardly from the top surface exterior member 300 in the X axis direction. However, the deviation is merely about 0.18 mm, which is hardly recognized by the user.

While the gap g9 is generated in the Z axis direction between the top surface exterior member 300 and the side surface exterior member 200 on the back cover 114 side, the gap g10 on the display unit 112 side is extremely small. Accordingly, even when a user sees the PC 100 from the display unit 112 side, the gap g9 cannot be recognized by the user. Since the user sees the tilting top surface exterior member 300 from the fulcrum side, the gap between the top surface exterior member 300 and the base body 400 in the Z axis direction cannot be recognized by the user.

Next, how the members return to the normal positions will be described. As the temperature increases, the contracted base body 400 and top surface exterior member 300 expand. Accordingly, the dowel pin 230 of FIG. 22C returns to the normal position (FIG. 22A) along the tapered inner wall of the dowel hole portion 303. The top surface exterior member 300 also returns to the normal position and the gap g7 in the Z axis direction disappears. The elastic holder 450 of FIG. 23C also returns to the normal position (FIG. 23A) with the elastic force. The boss portion 432 engaged with the boss receiving hole portion 305 serves as a fulcrum for restoration of the top surface exterior member 300 with respect to the base body 400.

This embodiment has the precondition that the shape of the PC 100 changes due to the thermal expansion difference of the side surface exterior member 200 and the top surface exterior member 300 from the base body 400. This embodiment is made based on the concept of structuring the PC 100 while accepting the change of the shape of the PC 100 and making the gap between the side surface exterior member 200 and the top surface exterior member 300 inconspicuous. According to the electronic apparatus of this embodiment, the gap that is generated due to the thermal expansion difference can be controlled with a simple structure without increasing the number of members.

Note that in manufacturing the members including the top surface exterior member 300, the side surface exterior members 200, the base body 400, and the like, the respective members may vary in shape. Also by such variations, there is a fear that gaps may be generated between the top surface exterior member 300, the side surface exterior members 200, and the base body 400. However, according to this embodiment, the gaps due to the variations can also be controlled by the above structure. For example, in a case where the top surface exterior member 300 is manufactured with a length smaller than a desired length in the Y axis direction, the gap is controlled in the same manner as in the above case of the temperature increase. In a case where the top surface exterior member 300 is manufactured with a length larger than a desired length in the Y axis direction, the gap is controlled in the same manner as in the above case of the temperature decrease.

It should be understood by those skilled in the art that various modifications, combinations, sub-combinations and alterations may occur depending on design requirements and other factors insofar as they are within the scope of the appended claims or the equivalents thereof.

In this embodiment, the dowel hole portion 303 is provided to the top surface exterior member 300, and the dowel pin 230 is provided to the side surface exterior member 200. However, the dowel hole portion 303 may be provided to the side surface exterior member 200, and the dowel pin 230 may be provided to the top surface exterior member 300. Similarly, the boss receiving hole portion 305 is provided to the top surface exterior member 300, and the boss portion 432 is provided to the base body 400. However, the boss receiving hole portion 305 may be provided to the base body 400, and the boss portion 432 may be provided to the top surface exterior member 300.

According to this embodiment, the desktop personal computer is employed as the electronic apparatus. However, the present invention is not limited thereto, and a television or a projector may be employed as the electronic apparatus.

According to this embodiment, the PC 100 is provided with the stand 111. However, the PC 100 may be structured as a wall-hanging type by providing a wall-hanging bracket member or the like in the vicinity of the back cover 114.

The present application contains subject matter related to that disclosed in Japanese Priority Patent Application JP 2008-223375 filed in the Japan Patent Office on Sep. 1, 2008, the entire content of which is hereby incorporated by reference.

What is claimed is:

1. An electronic apparatus, comprising:
a base body that is made of a resin and includes a rectangular main surface, two first side surfaces respectively including two short sides of the main surface, and two second side surfaces respectively including two long sides of the main surface;
two first exterior members that are each made of metal and respectively cover the two first side surfaces of the base body;
a second exterior member that is made of metal and adhered to the base body such that one of the second side surfaces of the base body is covered by the second exterior member;
a plurality of dowel pins provided to the two first exterior members such that tip end portions thereof protrude from the one of the second side surfaces of the base body;
a plurality of dowel hole portions that are provided to the second exterior member and capable of receiving the plurality of dowel pins, respectively;
a plurality of held portions provided on a surface of the second exterior member that faces the one of the second side surfaces of the base body while protruding therefrom, the plurality of held portions being provided in correspondence with the plurality of dowel hole portions; and
a plurality of elastic holders that are provided on the one of the second side surfaces of the base body and capable of holding and elastically supporting the plurality of held portions, respectively.

2. The electronic apparatus according to claim 1, wherein each of the plurality of elastic holders includes an elongated portion having one end portion continuously formed with the base body and a holder that is provided to the other end portion of the elongated portion and holds the corresponding one of the plurality of held portions.

3. The electronic apparatus according to claim 2, further comprising
a display unit provided on the main surface,
wherein each of the plurality of elastic holders is provided closer to the main surface than each of the plurality of dowel pins in a depth direction of the display unit.

4. The electronic apparatus according to claim 3,
wherein the elongated portion of each of the plurality of elastic holders is provided closer to the main surface than each of the plurality of holders in the depth direction of the display unit.

5. The electronic apparatus according to claim 4,
wherein each of the plurality of held portions includes a column portion that has a first diameter, protrudes from the second exterior member, and is held by the holder, and a stopper portion that has a second diameter larger than the first diameter and is provided on a tip end portion of the column portion.

6. The electronic apparatus according to claim 5,
wherein the holder includes a first tapered portion that guides insertion of the corresponding one of the plurality of held portions.

7. The electronic apparatus according to claim 6,
wherein each of the plurality of dowel hole portions includes a second tapered portion that guides insertion of the corresponding one of the plurality of dowel pins.

8. The electronic apparatus according to claim 7, further comprising:
a plurality of boss portions that are provided on the one of the second side surfaces of the base body and protrude from the one of the second side surfaces, the plurality of boss portions being provided in correspondence with the plurality of elastic holders; and
a plurality of boss receiving hole portions that are provided to the second exterior member and capable of receiving the plurality of boss portions, respectively.

9. The electronic apparatus according to claim 8,
wherein a length of each of the plurality of boss portions in a direction of the short sides of the main surface is smaller than a length of each of the dowel pins protruding from the second side surface in the direction of the short sides of the main surface.

10. The electronic apparatus according to claim 9,
wherein each of the plurality of boss portions is provided closer to the main surface than each of the plurality of elastic holders in the depth direction of the display unit.

11. The electronic apparatus according to claim 10,
wherein the second exterior member includes an adhesion prohibition area in which provision of the adhesion is prohibited, and the adhesion prohibition area includes at least a center portion of the second exterior member in a direction of the long sides of the main surface.

* * * * *